US012498235B2

(12) United States Patent
Gamalath et al.

(10) Patent No.: US 12,498,235 B2
(45) Date of Patent: Dec. 16, 2025

(54) VEHICLE CAMERA SYSTEM FOR VIEW CREATION OF VIEWING LOCATIONS

(71) Applicant: Rivian IP Holdings, LLC, Irvine, CA (US)

(72) Inventors: Dineth Gamalath, Huntington Beach, CA (US); Quentin Arthur Cradock Watson Spottiswoode, York Close (GB); Geoffrey Francis Burns, Palo Alto, CA (US); Sreenivasulu Gosangi, San Ramon, CA (US); Dukhwan Kim, Mountain View, CA (US); Krishna Kumar Madaparambil, San Jose, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 193 days.

(21) Appl. No.: 18/339,953

(22) Filed: Jun. 22, 2023

(65) Prior Publication Data

US 2024/0426623 A1    Dec. 26, 2024

(51) Int. Cl.
*G01C 21/36* (2006.01)
*G06V 10/10* (2022.01)
(Continued)

(52) U.S. Cl.
CPC ......... *G01C 21/3602* (2013.01); *G06V 10/16* (2022.01); *G06V 20/58* (2022.01);
(Continued)

(58) Field of Classification Search
CPC .... G01C 21/3602; G06V 10/16; G06V 20/58; H04N 5/2624; H04N 5/272; H04N 7/183
(Continued)

(56) References Cited

U.S. PATENT DOCUMENTS

| 10,194,097 B2* | 1/2019 | Abbas ................. H04N 23/698 |
| 2013/0131978 A1* | 5/2013 | Han ........................ G06T 17/05 |
| | | 701/436 |

(Continued)

OTHER PUBLICATIONS

Jiang Yu Zheng, "Digital route panoramas," in IEEE MultiMedia, vol. 10, No. 3, pp. 57-67, Jul.-Sep. 2003, doi: 10.1109/MMUL. 2003.1218257. (Year: 2003).*

(Continued)

*Primary Examiner* — Tiffany P Young
*Assistant Examiner* — Merritt E Levy
(74) *Attorney, Agent, or Firm* — BAKERHOSTETLER

(57) ABSTRACT

Aspects of the subject disclosure relate to a vehicle camera system for view creation of terrain view locations. A vehicle includes a first camera and a second camera and includes a processor configured to receive a route request to provide a route projection for the vehicle. The processor receives first data from the first camera and second data from the second camera. The processor combines the first data having a first field of view with the second data having a second field of view to create a stitched image representing a scene in a combined field of view. The processor provides overlay information mapped to pixel coordinates of the stitched image and provides, for display, a terrain view that includes the stitched image and the overlay information. The terrain view may be displayed in one of multiple selectable views based on a driving mode of the vehicle.

20 Claims, 14 Drawing Sheets

(51) Int. Cl.
  *G06V 20/58* (2022.01)
  *H04N 5/262* (2006.01)
  *H04N 5/272* (2006.01)
  *H04N 7/18* (2006.01)
(52) U.S. Cl.
  CPC ........... *H04N 5/2624* (2013.01); *H04N 5/272* (2013.01); *H04N 7/183* (2013.01)
(58) Field of Classification Search
  USPC ......................................................... 701/428
  See application file for complete search history.

(56) References Cited

U.S. PATENT DOCUMENTS

| | | | | |
|---|---|---|---|---|
| 2014/0247328 | A1* | 9/2014 | Popham | B60T 7/22 348/49 |
| 2014/0247352 | A1* | 9/2014 | Rathi | G06V 20/588 348/148 |
| 2015/0109444 | A1* | 4/2015 | Zhang | B60Q 9/008 348/148 |
| 2017/0109940 | A1* | 4/2017 | Guo | G06T 7/30 |
| 2017/0205885 | A1* | 7/2017 | Schpok | G01C 21/26 |
| 2017/0297488 | A1* | 10/2017 | Wang | G06T 5/80 |
| 2017/0324948 | A1* | 11/2017 | Lin | B60R 1/27 |
| 2019/0327415 | A1* | 10/2019 | Prabhakar | H04N 23/667 |
| 2021/0086695 | A1* | 3/2021 | Mahnken | B62D 21/20 |
| 2023/0028593 | A1* | 1/2023 | Shriner | G06T 11/60 |
| 2023/0316773 | A1* | 10/2023 | Avadhanam | G06V 20/58 382/104 |

OTHER PUBLICATIONS

X. Wang, J. Y. Zheng and M. Shi, "Seamless visual guidance of virtual and real trips," 2004 International Conference on Cyberworlds, Tokyo, Japan, 2004, pp. 30-37, doi: 10.1109/CW.2004.55. (Year: 2004).*

H. Cheng, Z. Liu, N. Zheng and J. Yang, "Enhancing a Driver's Situation Awareness using a Global View Map," 2007 IEEE International Conference on Multimedia and Expo, Beijing, China, 2007, pp. 1019-1022, doi: 10.1109/ICME.2007.4284826. (Year: 2007).*

* cited by examiner

VEHICLE CAMERA SYSTEM FOR VIEW CREATION OF VIEWING LOCATIONS

INTRODUCTION

Vehicles, including electric vehicles, can include cameras for obtaining images of scenes surrounding a vehicle and infotainment systems for providing visualizations of the scenes surrounding the vehicle.

SUMMARY

The present disclosure relates to enhancing the visualization surrounding a vehicle where blind spots and non-line-of-sight angles make drivability of the vehicle challenging by obtaining images with overlapping fields of view from multiple wide field-of-view cameras and using this information to create a surround view with reconfigurable perspective views for situations where visibility is limited. The visualization of the surroundings of a vehicle can be adjusted to provide a representation of the vehicle from any angle with a change in perspective view (e.g., zoomed in visualization with a perspective view of a wheel/tire, zoomed out visualization with a bird's eye view of the vehicle, etc.). The images with the newly generated perspective views can then be stitched together to form a contiguous field of view. Additionally, image data can be stored and accessed from memory to be used during a stitching operation to fill any found gap in the visualization of the surroundings of the vehicle with the newly generated perspective view.

The change in perspective view in the visualization may be achieved through a series of mathematical transformations of the new image data (and/or historical image data) to render the surroundings of the vehicle in the desired perspective view. The image data can be augmented using vehicle speed and inertial measurement data to predict a pose of one or more cameras positioned on the vehicle for achieving a desired perspective view. The system also performs object detection to inform a driver of possible objects obstructing a path of the vehicle and/or feed into a recommendation algorithm for recommending a path trajectory via the visualization. Additionally, the visualization may be enhanced with overlay information (e.g., user interface elements representing vehicle trajectory guidelines, detected objects, etc.). The visualization may be provided to an infotainment system and may include different selectable views of the surroundings of the vehicle from different perspective views. The image processing of the visualization with the different perspective views can be performed onboard the vehicle along with the image data being stored on vehicle memory.

In accordance with one or more aspects of the disclosure, a method includes obtaining, by a processor, first data from a first camera of a vehicle and second data from a second camera of the vehicle, the first data comprising an image representation of a scene in a first field of view being observed from a first perspective view and the second data comprises an image representation of the scene in a second field of view being observed from the first perspective view; modifying the first data and the second data by one or more transformations to adjust the image representation of the scene from the first perspective view to a second perspective view; and creating, by the processor, a stitched image representing the scene in a combined field of view being observed from the second perspective view by stitching the modified first data having the first field of view with the modified second data having the second field of view.

In accordance with one or more aspects of the disclosure, a vehicle including a first camera and a second camera is provided that includes a processor configured to receive first data from the first camera, the first data comprising an image representation of a scene in a first field of view being observed from a first perspective view; receive second data from the second camera, the second data comprising an image representation of the scene in a second field of view being observed from the first perspective view; adjust the image representation of the scene from the first perspective view to a second perspective view by applying one or more perspective transformations to the first data and the second data; stitch the first data having the first field of view with the second data having the second field of view to create a stitched image representing the scene in a combined field of view being observed from the second perspective view; and provide the stitched image with overlay information mapped to pixel coordinates of the stitched image.

In accordance with one or more aspects of the disclosure, a semiconductor device is provided that includes circuitry configured to apply a perspective transformation to first data and second data to modify an image representation of a scene from a first perspective view to a second perspective view, the first data and second data being associated with different cameras of a vehicle; combine the first data with the second data to create a stitched image depicting the scene observed from the second perspective view; receive user interaction data indicating a desired perspective view based on one or more user interactions with the stitched image; apply a second perspective transformation to at least in part historical image data to modify the image representation of the scene from the second perspective view to a third perspective view that corresponds to the desired perspective view; and provide, for display, a modified stitched image depicting the scene being observed from the third perspective view.

In accordance with one or more aspects of the disclosure, a method includes receiving a route request to provide a route projection for a vehicle; receiving, by a processor, first data from a first camera of the vehicle and second data from a second camera of the vehicle, the first data comprising an image representation of a scene in a first field of view and the second data comprises an image representation of the scene in a second field of view; creating, by the processor, a stitched image representing the scene in a combined field of view by stitching the first data having the first field of view with the second data having the second field of view, the stitched image being provided with overlay information mapped to pixel coordinates of the stitched image; and provide, for display, a terrain view comprising the stitched image, the terrain view being displayed in one of a plurality of selectable views based on a driving mode of the vehicle, the overlay information in the terrain view indicating a representation of at least a portion of the vehicle in the route projection.

In accordance with one or more aspects of the disclosure, a vehicle including a first camera and a second camera is provided that includes a processor configured to receive a route request to provide a route projection for a vehicle; receive first data from the first camera, the first data comprising an image representation of a scene in a first field of view; receive second data from the second camera, the second data comprising an image representation of the scene in a second field of view; combine the first data having the first field of view with the second data having the second field of view to create a stitched image representing the scene in a combined field of view; provide overlay information mapped to pixel coordinates of the stitched image; and provide, for display, a terrain view comprising the stitched image and the overlay information, the terrain view being displayed in one of a plurality of selectable views based on a driving mode of the vehicle, the overlay information in the terrain view indicating a representation of at least a portion of the vehicle in the route projection.

In accordance with one or more aspects of the disclosure, a semiconductor device is provided that includes circuitry configured to receive user input indicating a terrain view selection; combine first data having a first field of view from a first camera of a vehicle with second data having a second field of view from a second camera of the vehicle to create a stitched image representing a combination of the first field of view and the second field of view; provide overlay information mapped to pixel coordinates of the stitched image; and provide, for display, in response to the terrain view selection, a terrain view comprising the stitched image and the overlay information, the terrain view being displayed in one of a plurality of selectable views based on a driving mode of the vehicle.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
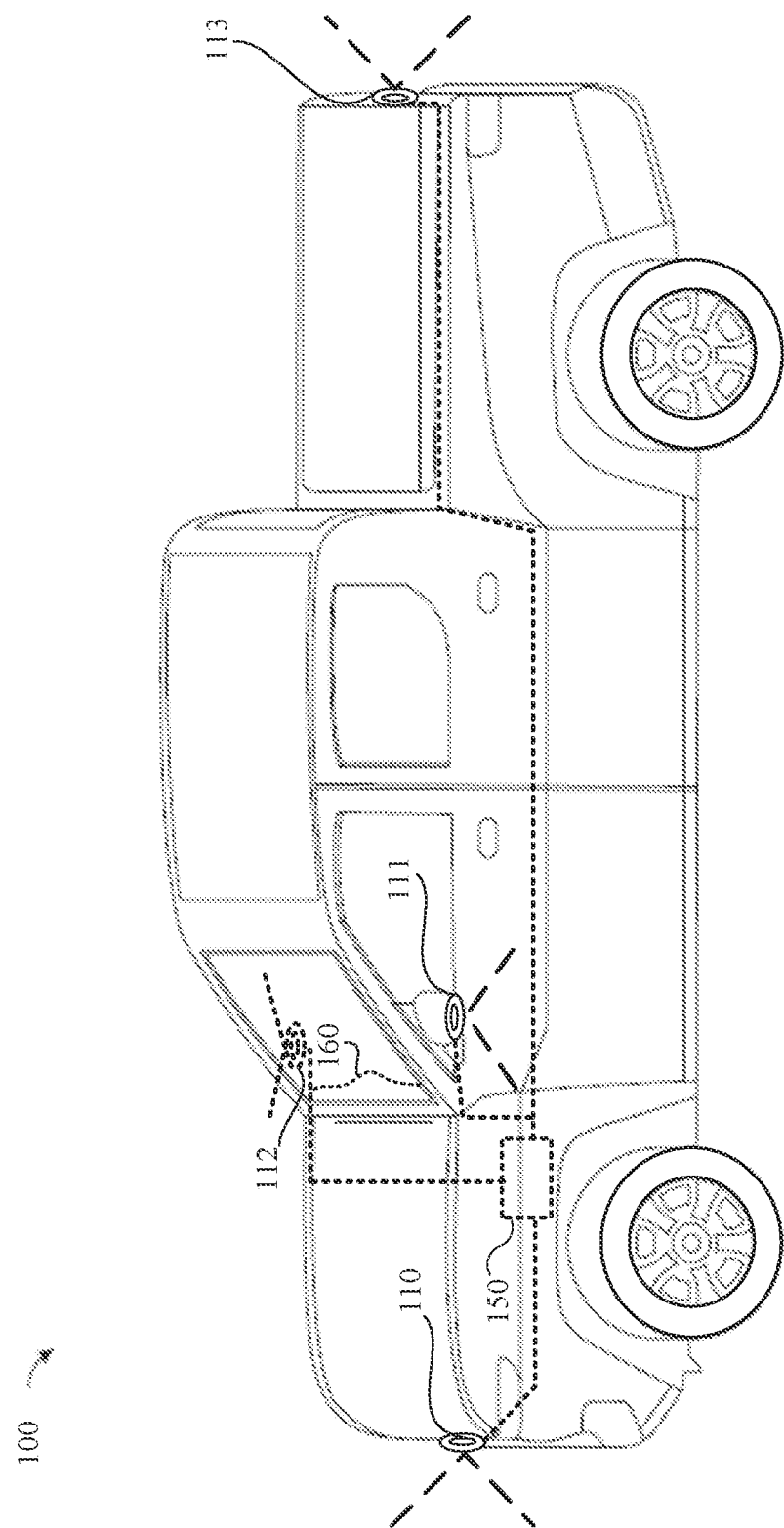
FIG. 1 illustrates a schematic perspective side view of an example implementation of a vehicle including a vehicle camera system for creation of viewing locations in accordance with one or more implementations of the subject technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

The present disclosure relates to a camera system that provides the creation of a three-dimensional (3D) surround view in real-time. The camera system provides for view creation of different view locations including, for example, a virtual bird's-eye view that allows a driver of a vehicle to observe the terrain surrounding the vehicle and make informed decisions. Such view creation can be realized by way of shifting perspective views of an image to a desired perspective view. The subject technology allows for a scenario where the driver can examine the tire's movement, for example, and closely assess how the terrain interacts with the tire's edges. However, due to limited visibility, obtaining a precise view of the tire becomes challenging. The subject technology leverages historical image data to assume the tire's position, enabling the driver to make strategic choices as the driver navigates the vehicle through rugged terrain.

The process of modifying the perspective view of an image can be based on the vehicle's movement and the corresponding historical image data. By synchronizing and adjusting image frames in the historical image data based on the vehicle's motion, the camera system can create a dynamic and adaptable visualization of different areas surrounding the vehicle. This dynamic visualization enables users to explore and examine the information from arbitrary angles or positions, resulting in a safer and more informed driving experience.

This camera system not only enables the visualization of historical image data but also extends the capabilities of perspective view by offering, in almost real time, views from arbitrary angles or positions, including a view capturing the area beneath a vehicle. For example, the visualizations may include a combination of images with partially overlapping views from different perspective views to create a seamless and reconfigurable visualization experience for a user of the vehicle. The camera system may analyze the historical image data corresponding to previously input data captured by the camera, continuously analyzing the environment to provide an immersive and comprehensive perspective. By assuming the tire's position, for example, based on the past presence of an obstacle, such as a rock, the camera system determines where the relevant pixels should be located. The camera system can adjust these pixels, seamlessly moving them to the assumed position of the tire. This process enables the driver to visualize the terrain's proximity to the tire's edge, granting the driver insight into whether there is sufficient space to traverse rocky areas.

By leveraging the historical image data captured by the cameras, this technique enables a comprehensive understanding of the vehicle's surrounding environment, even for areas not directly visible during a navigational route of the vehicle. Through shifting and alignment of different segments of the historical image data, the system allows users to visualize the surroundings of the vehicle from various perspective views, enhancing their situational awareness. Regardless of the direction a driver selects or the maneuver used for the vehicle placement, the camera system can pull in pixel data from the historical image data, incorporating the camera's previous observations represented as frames in the historical image data. This integration of the historical image data allows the driver to make informed decisions as the driver explores off-road terrain with freedom in any direction.

The camera system can continuously capture a stream of images from multiple cameras installed on the vehicle. These images undergo real-time processing, employing image processing algorithms and geometric transformations, resulting in the generation of an instantaneous and immersive 3D surround view. This 3D surround view provides the driver and passengers with a visual representation of their immediate surroundings, enhancing their overall experience. The camera system can incorporate additional features such as image stitching, image enhancement, and user interaction capabilities. These features contribute to a seamless and user-friendly interface, ensuring intuitive interaction with the camera system.

In one or more implementations, the subject system obtains first data from a first camera of a vehicle and second data from a second camera of the vehicle. In some aspects, the first data includes an image representation of a scene in a first field of view being observed from a first perspective view and the second data includes an image representation of the scene in a second field of view being observed from the first perspective view. The subject system also can modify the first data and the second data by one or more transformations to adjust the image representation of the scene in each of the first data and the second data from the first perspective view to a second perspective view. The subject system also creates a stitched image representing the scene in a combined field of view being observed from the second perspective view by stitching the modified first data having the first field of view with the modified second data having the second field of view.

The subject technology also provides for a camera system that creates a terrain view feature that enables users to have an enhanced visual perception of their surroundings while operating a vehicle. By utilizing a combination of camera feed stitching techniques, this terrain view feature provides users with a comprehensive view ahead, underneath, and to the sides of the vehicle. The camera feed captures image data from the front and sides of the vehicle, which are then seamlessly merged to create a single, comprehensive image that showcases the forward view, underbody view, and side view. By integrating these different perspectives, users can gain a holistic understanding of the terrain and potential obstacles surrounding their vehicle. By overlaying tire placement and trajectory guidelines onto the stitched image, users can observe the area between the front side mirrors and a specified distance ahead of the vehicle's current path. This area may correspond to the space covered by the front hood of the vehicle. The terrain view feature also can highlight any obstacles that may pose a potential collision risk to the vehicle's front or rear tires. These detected obstacles can be visually emphasized on the display, ensuring that users are aware of their presence.

To further enrich the user experience, the camera system seamlessly integrates with other vehicle systems, such as infotainment or driver assistance systems, enhancing the overall functionality and usability of the entire system. Accordingly, the subject system enables use of a vehicle camera system with view creation of terrain view locations without instantaneous field-of-view visibility.

FIG. 1 illustrates an example vehicle 100 including a vehicle camera system for view creation of locations for terrain view without instantaneous field-of-view visibility in accordance with one or more implementations of the subject technology. For explanatory purposes, the vehicle 100 is illustrated in FIG. 1 as a truck. However, the vehicle 100 is not limited to a truck and may also be, for example, a sport utility vehicle, a van, a delivery van, a semi-truck, an aircraft, a watercraft, a car, a motorcycle, or generally any type of vehicle or other moveable apparatus having a camera system that can integrate one or more external cameras.

In one or more implementations, one or more of the cameras 110-113, one or more of the location sensors, and/or other sensors of the vehicle 100 may periodically capture location data to determine a surround view of the vehicle 100. In one or more implementations, one or more of the cameras 110-113 of the vehicle 100 may periodically capture one or more images. The vehicle 100 may also analyze the images (e.g., via object recognition) to determine whether any obstructions are detected as approaching the vehicle 100 along a path trajectory. Where the location data is captured as one or more images (e.g., by the cameras 110-113), the vehicle 100 may analyze the images to determine whether such obstructions around a vicinity of the vehicle 100 are visible in the images. Where the location data is captured as global positioning system (GPS) data (e.g., by the geo-location sensors 330 of FIG. 3), the vehicle 100 may analyze the location data with respect to a known route trajectory of the vehicle 100 to determine whether any detected objects are located along the route trajectory of the vehicle 100. In other aspects, the vehicle 100 may analyze the images to determine an omnidirectional visualization of the surroundings of the vehicle 100 and provide a surround view of the vehicle 100. For example, the subject system may process the data from all cameras (e.g., cameras 110-113) and create a cohesive image that accurately reflects the position and orientation of the vehicle 100.

In some implementations, the vehicle 100 can include an electronic control unit (ECU) 150. Since image stitching can be computationally intensive, the ECU 150 may include a powerful processing unit such as a dedicated graphics processing unit (GPU) or field-programmable gate array (FPGA) to perform the necessary image processing in real-time.

The subject system may use a combination of computer vision techniques and advanced algorithms to accurately track the position and orientation of the vehicle 100. The subject system may receive information about the geometry of the vehicle 100 as input parameters, as well as the surrounding environment. The system also may detect obstacles and other vehicles in the environment and display them in a surround view image via an infotainment display system 160.

To be usable by drivers, the vehicle camera system would need to provide a clear and intuitive user interface for displaying the stitched images. This could involve integrating the surround view display with existing dashboard displays or providing a separate display dedicated to the surround view. The infotainment display system 160 may potentially include additional features such as object detection or distance estimation to further enhance driver awareness and safety.

In some implementations, at least one of the cameras 110-113 may be wireless. In this regard, a mechanism for wireless communication between the cameras 110-113 and the ECU 150 may be implemented. This can involve using a wireless protocol such as Bluetooth or Wi-Fi, or using specialized wireless modules such as ZigBee or LoRa for longer-range communication. To ensure reliable transmission of the images over wireless communication, data transfer protocols such as transmission control protocol (TCP) or user datagram protocol (UDP) can be used. These protocols enable error detection and correction, packet retransmission, and other mechanisms to ensure reliable data transfer over unreliable wireless links.

Calibration can be performed while the vehicle 100 is moving to calculate precise position and pose to support stitching of the camera image into images from other vehicle cameras. To provide the most comprehensive and accurate surround view, the vehicle camera system may potentially incorporate data from multiple types of sensors in addition to the image sensors 110-113. This can include sensors such as lidar or radar to provide additional depth and distance information, as well as sensors to detect the orientation and movement of the vehicle 100.

Figure 2:
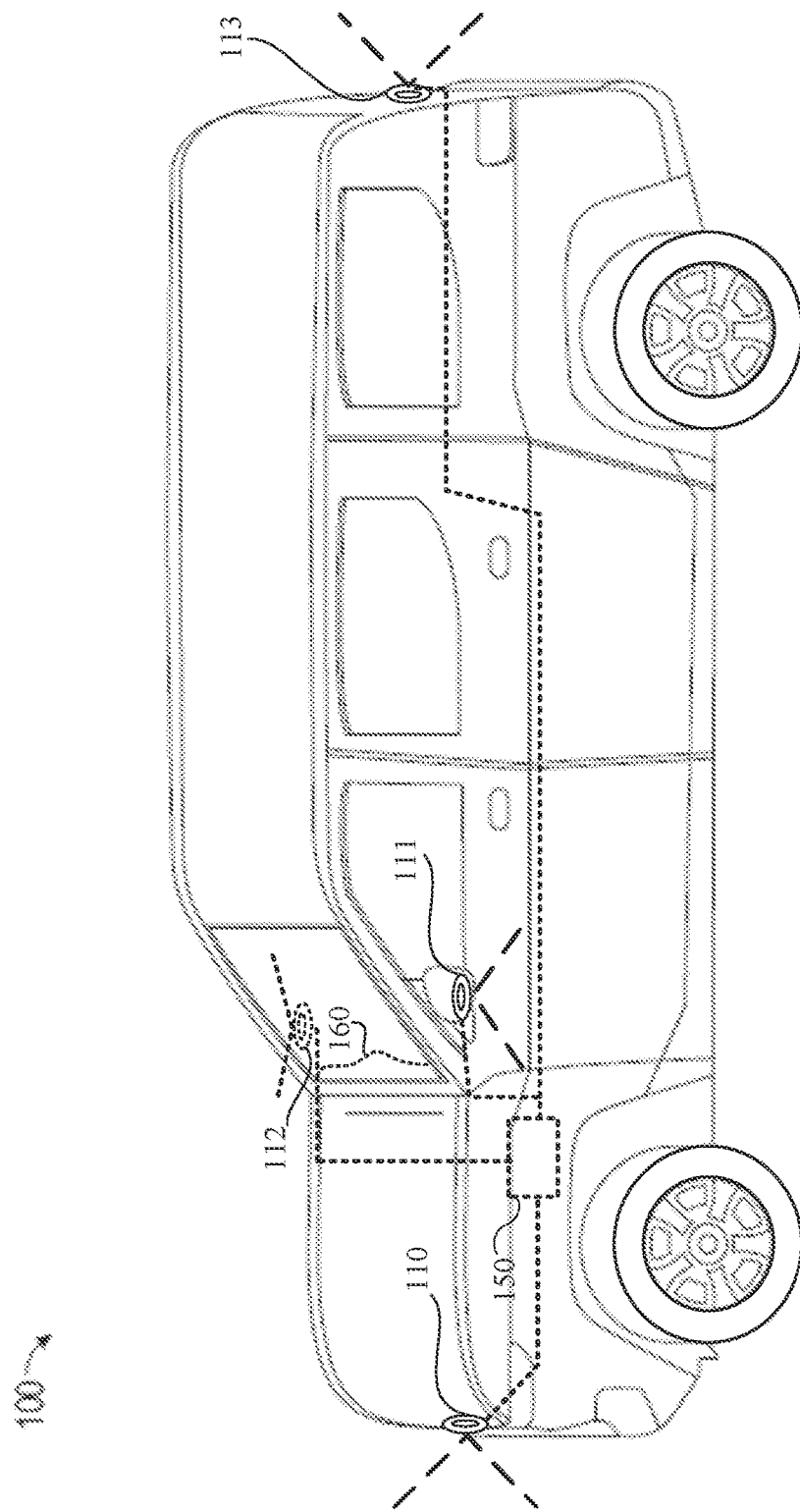
FIG. 2 illustrates a schematic perspective side view of an example implementation of a vehicle including a vehicle camera system for creation of viewing locations in accordance with one or more implementations of the subject technology.

The example of FIG. 1 in which the vehicle 100 is implemented as a pickup truck having a truck bed at the rear portion thereof is merely illustrative. For example, FIG. 2 illustrates another implementation in which the vehicle 100 including a vehicle camera system for view creation of viewing locations is implemented as a sport utility vehicle (SUV), such as an electric sport utility vehicle. In the example of FIG. 2, the vehicle 100 may include a cargo storage area that is enclosed within the vehicle 100 (e.g., behind a row of seats within a cabin of the vehicle). In other implementations, the vehicle 100 may be implemented as another type of electric truck, an electric delivery van, an electric automobile, an electric car, an electric motorcycle, an electric scooter, an electric bicycle, an electric passenger vehicle, an electric passenger or commercial truck, a hybrid vehicle, an aircraft, a watercraft, and/or any other movable apparatus having a camera system that can seamlessly integrate one or more external cameras.

Example components of a vehicle 100 that is configured to perform view creation of viewing locations are discussed further below with respect to FIG. 3. An example process flow for view creation of viewing locations is discussed further below with respect to FIG. 4.

Figure 3:
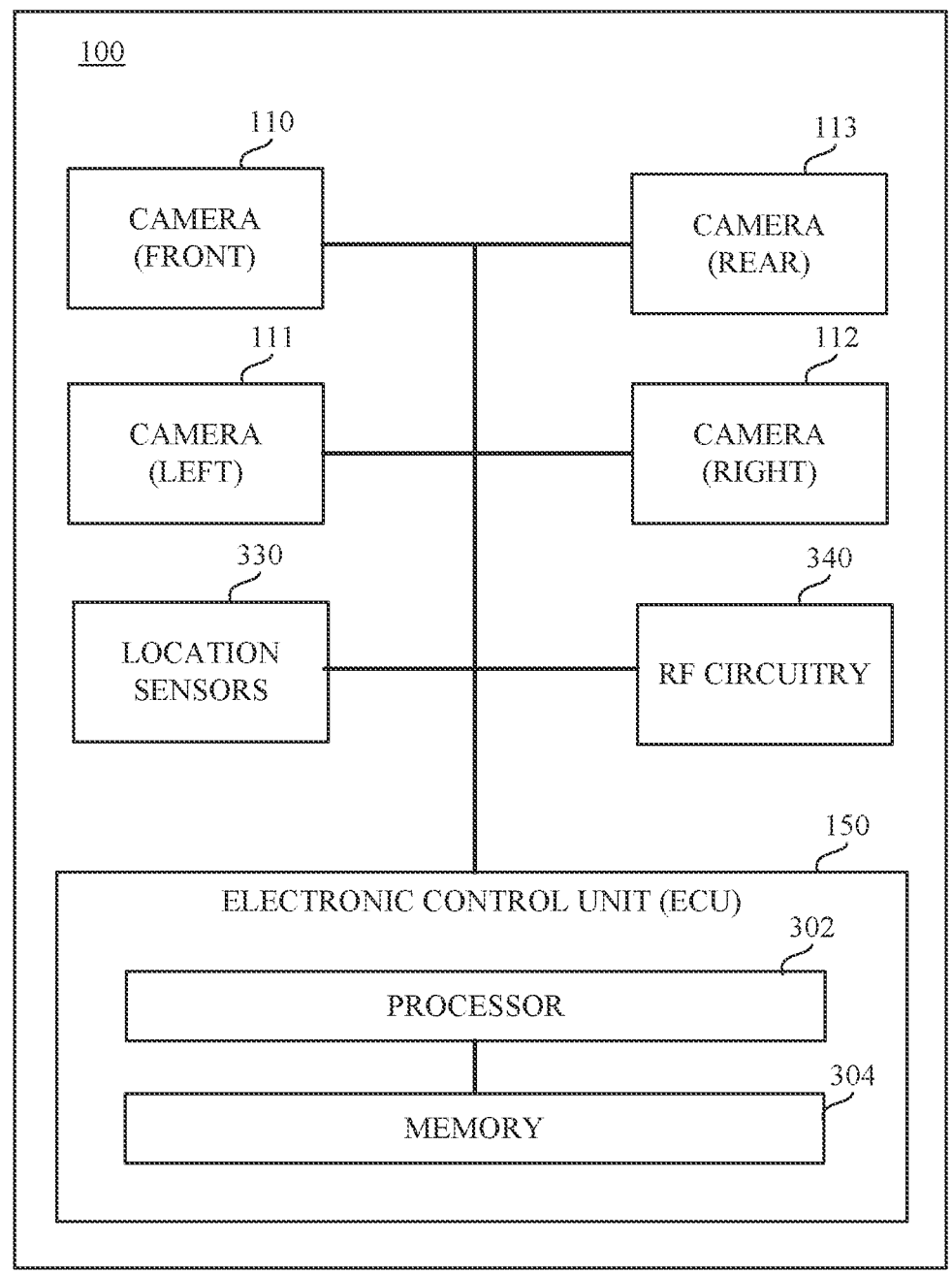
FIG. 3 illustrates a block diagram of an example system configured to perform view creation of viewing locations in accordance with one or more implementations of the subject technology.

FIG. 3 illustrates a block diagram of an example system configured to perform view creation of locations for terrain view without instantaneous field-of-view visibility in accordance with one or more implementations of the subject technology. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The vehicle 100 may include one or more ECUs 150, one or more of the cameras 110-113, one or more geo-location sensors 330, and radio frequency (RF) circuitry 340. The ECU 150 may include a processor 302 and a memory 304. In one or more implementations, the vehicle 100 may include a processor 302 and/or a memory 304 separate from the ECU 150. For example, the vehicle 100 may not include the ECU 150 and may include the processor 302 as a part or all of a separate semiconductor device. In one or more implementations, vehicle 100 may include multiple ECUs 150 that each control particular functionality of the vehicle 100.

The processor 302 may include suitable logic, circuitry, and/or code that enables processing data and/or controlling operations of the vehicle 100. In this regard, the processor 302 may be enabled to provide control signals to various other components of the vehicle 100. The processor 302 may also control transfers of data between various portions of the vehicle 100. The processor 302 may further implement an operating system, such as a real-time operating system, or may otherwise execute code to manage operations of the vehicle 100.

The memory 304 may include suitable logic, circuitry, and/or code that enable storage of various types of information such as received data, machine learning model data (such as for computer vision and/or other user/object detection algorithms), user authentication data, and/or configuration information. The memory 304 may include, for example, random access memory (RAM), read-only memory (ROM), flash, and/or magnetic storage. In one or more implementations, the memory 304 may store identifiers and/or authentication information of one or more users to determine authorized users and/or authorized authentication devices of the vehicle 100. The memory 304 may also store account information corresponding to an authorized user for exchanging information between the vehicle 100 and a remote server. The memory 304 may also store geo-location data, including the geographic locations of charging stations and the frequency at which one or more charging stations is used to charge the battery. The memory 304 may also store battery data, including an amount of time that has elapsed since the battery was last charged.

The cameras 110-113 may be, or be included at least in part in, an onboard camera, dashcam, event camera, infrared camera, video camera, or any other type of device that captures digital image representations of a physical environment. The cameras 110-113 may be used to capture images for detecting and/or recognizing people and/or objects. For example, images captured by at least one of the cameras 110-113 may be input into a trained facial recognition model for identifying a type of terrain, which may be compared to, for example, a database of terrain types stored in the memory 304.

The RF circuitry 340 may include suitable logic, circuitry, and/or code that enables wired or wireless communication, such as locally within the vehicle 100 and/or between the vehicle 100 and one or more of the cameras 110-113. The RF circuitry 340 may include, for example, one or more of an ultra-wideband (UWB) interface, a Bluetooth communication interface, a near-field communication (NFC) interface, a Zigbee communication interface, a wireless local area network (WLAN) communication interface, a universal serial bus (USB) communication interface, a cellular interface, or generally any interface for transmitting and/or receiving electronic communications. The RF circuitry 340 can communicate with or otherwise detect other cameras positioned on the vehicle 100, for example by detecting a proximate camera with UWB ranging. In one or more implementations, the geo-location sensors 330 may include suitable logic, circuitry, and/or code that enable motion detection such as movement data and/or vehicle speed data. In one or more other implementations, the geo-location sensors 330 may include an inertial measurement unit (IMU) device that measures and reports specific force, angular rate, and/or orientation of the vehicle 100, using a combination of accelerometers, gyroscopes, and magnetometers included in the geo-location sensors 330.

In one or more implementations, one or more of the processor 302, the memory 304, the cameras 110-113, the geo-location sensors 330, the RF circuitry 340, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices), and/or a combination of both.

View Creation of Locations with Different Perspective Views

The subject technology relates to enhancing the visualization of the surroundings of the vehicle 100 where blind spots and non-line-of-sight angles make drivability of the vehicle 100 challenging by obtaining images with overlapping fields of view from multiple wide field-of-view cameras (e.g., cameras 110-113) and using this information to create a surround view with reconfigurable perspective views for situations where visibility is limited. The images can then be stitched together to form a contiguous field of view. The visualization of the surroundings of the vehicle 100 can be adjusted to provide a representation of the surroundings including a representation of the vehicle 100 from any angle with a change in perspective view (e.g., zoomed in visualization with a perspective view of a wheel/tire, zoomed out visualization with a bird's eye view of the vehicle 100, etc.). Additionally, previously input data can be stored as historical image data and accessed from the memory 304 to be used to fill a gap in a visualization of the surroundings of the vehicle 100 from the newly generated perspective view.

The change in perspective view in the visualization may be achieved through a series of mathematical transformation of the new image data (and/or historical image data) to render the surroundings of the vehicle 100 in the desired perspective view. In some aspects, a mathematical transformation refers to a series of mathematical operations applied to the image to modify its perspective view and simulate a different perspective view. These mathematical transformations may be based on principles from projective geometry and involve adjusting the spatial relationships and visual properties of the objects in the image to create the illusion of a new perspective view. In one or more implementations, these mathematical transformations may include a perspective transformation, a homography transformation, a 3D transformation, an affine transformation, a direct linear transform (DLT), a random sample consensus (RANSAC), or other transformation algorithms of the like. The term "perspective view" also can be referred to as a viewing angle or vantage point.

In some implementations, the mathematical transformation used for the perspective adjustment may represent a perspective transformation. A perspective transformation may be a mathematical mapping between the coordinates of the original image and the coordinates of the desired perspective view. In one or more implementations, the perspective transformation may be defined by a 4×4 perspective transformation matrix. This mapping can allow for the calculation of how each point in the original image should be transformed to appear as if it were captured from the new vantage point. The perspective transformation may involve a set of parameters that define the relative positions, orientations, and distances between the camera and the new perspective view. By manipulating these parameters, the perspective transformation can change the apparent sizes, shapes, and angles of objects in the image, simulating the effect of viewing the scene from a different location, such as from the new perspective view. To apply the perspective transformation, each pixel in the original image is mapped to its corresponding position in the transformed image using a calculated mapping function. This mapping function can analyze the perspective distortion caused by the difference in distance from the camera to different points in the scene. In one or more other implementations, the mathematical transformation used for the perspective adjustment may represent a 3D transformation that includes operations such as zoom, rotation, pitch, yaw, and translations in three axes (e.g., x, y, and z) combined into a matrix operation (e.g., a 4×4 transformation matrix).

The image data can be augmented using vehicle speed and inertial measurement data to predict a pose of a camera on the vehicle 100 for a specified perspective view. The system also performs object detection to inform a driver of possible objects obstructing a path of the vehicle 100 and/or feed into a recommendation algorithm for recommending a path trajectory via the visualization. Additionally, the visualization may be enhanced with overlay information (e.g., vehicle trajectory guidelines, detected objects, etc.). The visualization may be provided to an infotainment system via the infotainment display system 160 and may include different selectable views depicting the surroundings of the vehicle 100 from different perspective views. The image processing of the visualization with the different perspective views can be performed on-board along with the image data being stored as historical image data on vehicle memory.

Surround view in the automotive industry can involve using multiple cameras mounted on different parts of the vehicle 100 to capture a 360-degree view of the surroundings. Traditionally, surround view is visualized as an oval ball, where the images captured by the cameras are projected onto the inner surface of the ball, creating a panoramic view of the vehicle's surroundings. However, this visualization can be improved by building a sphere around the vehicle 100, which allows for a more accurate and realistic image representation of the surroundings. By knowing the position of each camera, a sphere can be built around the vehicle 100, which allows the user to move the vehicle 100 around and see the entire surround view. With this information, the position of the vehicle 100 and the surroundings can be accurately represented in the sphere. The sphere may be configurable based on the specific parameters of the vehicle 100. For example, in the rear of the vehicle 100, a separate sphere can be connected to the main sphere to provide a more detailed view of the rear surroundings. By allowing a configurable sphere, it allows for a more tailored and optimized surround view of the vehicle 100 from different perspective views.

The subject technology includes cameras positioned strategically around the vehicle 100 (as denoted by cameras 110-113) to capture images from all angles. The cameras on the vehicle 100 can be positioned on the front, back, and sides and/or the rear. The number of cameras used in this configuration may depend on the number of perspective views to be presented and/or granularity of each respective view. In some examples, three cameras can be used for a small vehicle and up to six cameras for a larger vehicle. For example, two cameras (e.g., 111 and 112) can be positioned on each side of the vehicle 100, providing more coverage and reducing blind spots. In some implementations, the system may include cameras at fixed locations, at arbitrary locations using wireless communication between the cameras, and/or a combination of both fixed and wireless cameras. In some aspects, the wireless cameras can be used for other applications such as off-road under-body camera feed for rock crawling. The cameras can potentially be designed to withstand harsh environments and extreme conditions, such as dust, dirt, water, and impact resistance. By using multiple cameras, the system can capture a wider field of view, allowing the driver of the vehicle 100 to see more of the surroundings and make safer maneuvers.

Figure 4:
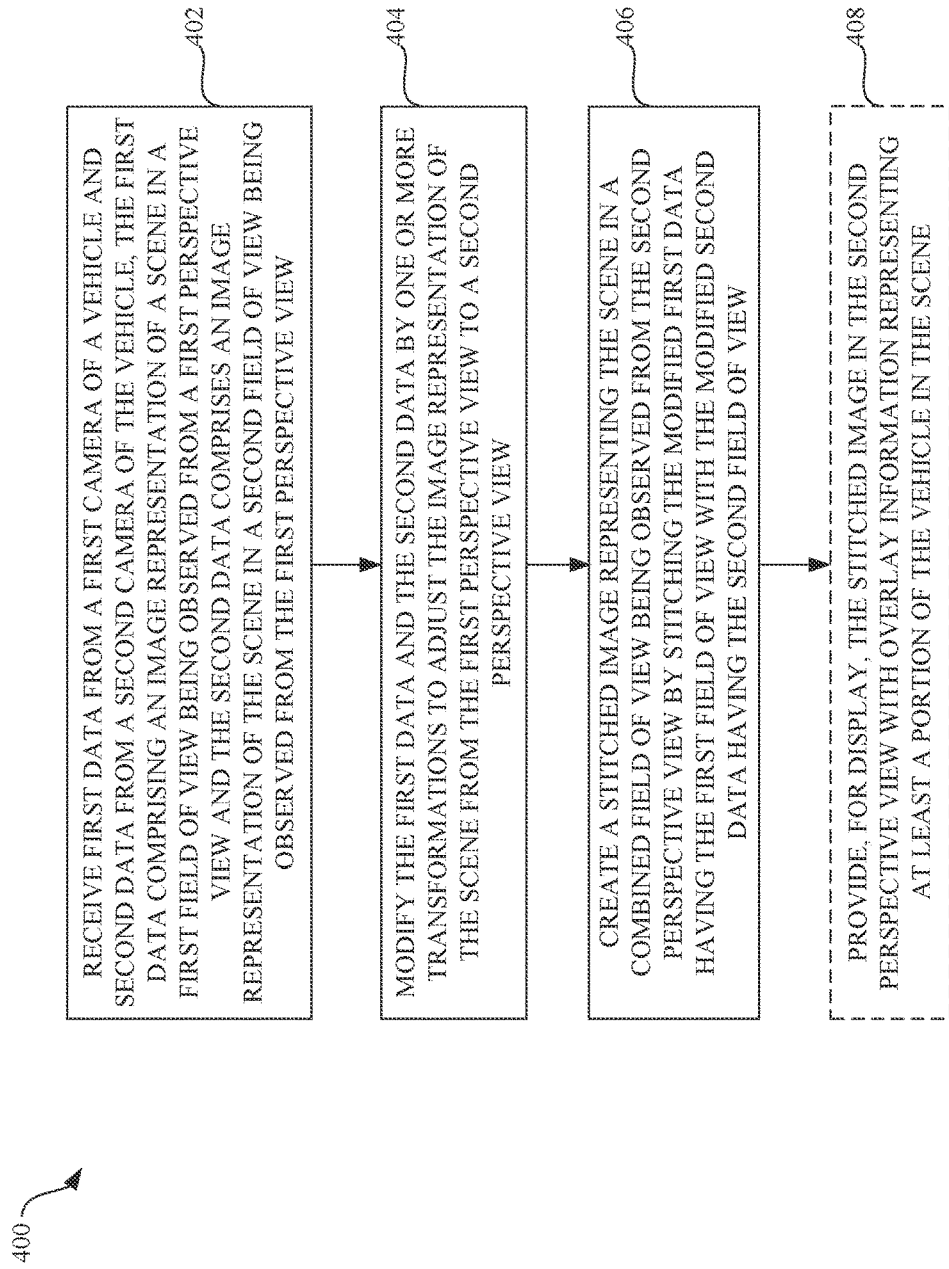
FIG. 4 illustrates a flow diagram of an example process for view creation of viewing locations in accordance with one or more implementations of the subject technology.

FIG. 4 illustrates a flow diagram of an example process 400 for view creation of viewing locations in accordance with one or more implementations of the subject technology. For explanatory purposes, the process 400 is primarily described herein with reference to the vehicle 100 of FIGS. 1-3, and/or various components thereof. However, the process 400 is not limited to the vehicle 100 of FIG. 1, and one or more steps (or operations) of the process 400 may be performed by one or more other structural components of the vehicle 100 and/or of other suitable moveable apparatuses, devices, or systems. Further, for explanatory purposes, some of the steps of the process 400 are described herein as occurring in serial, or linearly. However, multiple steps of the process 400 may occur in parallel. In addition, the steps of the process 400 need not be performed in the order shown and/or one or more steps of the process 400 need not be performed and/or can be replaced by other operations.

At step 402, the processor 302 may receive first data from a first camera of the vehicle 100 and second data from a second camera of the vehicle 100. In some aspects, the first data may be image data that includes an image representation of a scene in a first field of view being observed from a first perspective view and the second data may include an image representation of the scene in a second field of view being observed from the first perspective view. The first field of view and the second field of view may correspond to different portions of a scene. In some aspects, the first perspective view may correspond to the viewing angle from the perspective of the vehicle 100.

At step 404, the processor 302 may modify the first data and the second data by one or more transformations to adjust the image representation of the scene from the first perspective view to a second perspective view. In some aspects, the second perspective view may represent a desired vantage point of a virtual camera located relative to a position of the vehicle being observed. For example, the virtual camera may be represented as a virtual drone capturing images of the vehicle and/or its surroundings from its vantage point such that the angle and/or position from which the virtual drone is capturing the images may be reconfigurable and/or selectable via user input. In some implementations, the one or more transformations for perspective adjustment may be referred to as a perspective transformation. Perspective transformation may be a mathematical mapping between the coordinates of the original image and the coordinates of the desired perspective view. This mapping can allow for the calculation of how each point in the original image should be transformed to appear as if it were captured from the new vantage point.

At step 406, the processor 302 may create a stitched image representing the scene observed from the second perspective view in a combined field of view by stitching the modified first data having the first field of view with the modified second data having the second field of view.

In some implementations, stitching together images from different camera sources and angles involves technical concepts, including camera calibration, feature extraction and matching, homography estimation, and image blending. In camera calibration, each camera may have its own unique set of intrinsic parameters that determine how it captures the scene. Camera calibration may involve determining these parameters, including the focal length, principal point, and distortion coefficients, which can be used for accurately stitching images together. In feature extraction and matching, corresponding points or features between different images may need to be found to stitch images together. Feature extraction involves identifying distinctive points or areas in each image, while feature matching involves finding corresponding features across multiple images.

In homography estimation, once corresponding features have been identified between two or more images, homography estimation is used to compute the transformation between the images. Homography is a mathematical model that describes the relationship between two planes in 3D space, which is used to warp and align the images. After the images have been aligned, image blending is used to create a seamless transition between the stitched images. This involves blending the overlapping regions of the images together to create a seamless, natural-looking panorama. Accordingly, stitching together images from different camera sources and angles may require a combination of image processing, computer vision, and mathematical techniques, as well as an understanding of the intrinsic properties of cameras and how they capture images.

In some implementations, the stitching is performed using one or more artificial intelligence (AI) algorithms, such as a trained machine learning model. For example, a deep learning (DL) based image stitching algorithm may be used as a computer vision technique that uses neural networks to automatically stitch together multiple images into a seamless panorama. Unlike traditional image stitching techniques, which rely on feature extraction and matching, these DL-based image stitching algorithms can learn to recognize and align features directly from raw image data, without the need for explicit feature extraction.

In some aspects, the DL-based image stitching algorithm may include a convolutional neural network (CNN)-based approach. In this approach, a CNN is trained to predict the homography transformation between pairs of input images, using a large dataset of training examples. Once the network is trained, it can be used to align and stitch together arbitrary sets of input images, without requiring manual intervention or explicit feature extraction. In other aspects, the DL-based approach to image stitching may include the use of generative adversarial networks (GANs), which can be trained to generate high-resolution panoramic images by learning to fill in missing regions between input images. GANs can also be used to improve the quality of stitched images by generating high-resolution textures and details that may be missing in the input images.

In some implementations, the stitched image is created at least in part from the historical image data stored in the memory 304 that includes one or more image representations of the scene not included in the first data and the second data. For example, the processor 302 may prepare the first and second transformed images derived respectively from the first data and the second data for stitching and may determine there is a gap in the scene provided by the first and second transformed images. In this regard, the processor 302 may identify one or more segments of the historical image data stored in the memory 304 and thereafter applies a transformation operation on the one or more segments of the historical image data retrieved from the memory 304 for stitching with the first and second transformed images. In one or more implementations, the processor 302 may predict, using a trained machine learning algorithm, which pixel information in the historical image data is used to create the stitched image based on one or more of a pose, a motion or a heading of the vehicle. For example, if the vehicle is moving in a forward direction with a certain incline angle at a certain speed, the processor 302 may utilize this information to predict which pixel information from the historical image data stored in memory 304 will correspond to a projected vehicle's surroundings and/or other transformed images for combination into the stitched image.

At step 408, the processor 302 may, optionally, provide for display, via the infotainment display system 160, the stitched image in the second perspective view with overlay information representing at least a portion of the vehicle 100 in the scene. In some implementations, the stitched image can be provided for display in one of multiple perspective views selectable and/or reconfigurable via user input. For example, the processor 302 may receive, via the infotainment display system 160, user input indicating a change in perspective view. The processor 302 may render a modified stitched image observed from one of the multiple perspective views that corresponds to the change in perspective view. Accordingly, the processor 302 may provide for display the modified stitched image from the user-selected perspective view. In other implementations, the selection of which perspective views to display may be automated by way of a pre-configuration of the camera system or a programmed routine that automatically circulates through the different perspective views.

Figure 5:
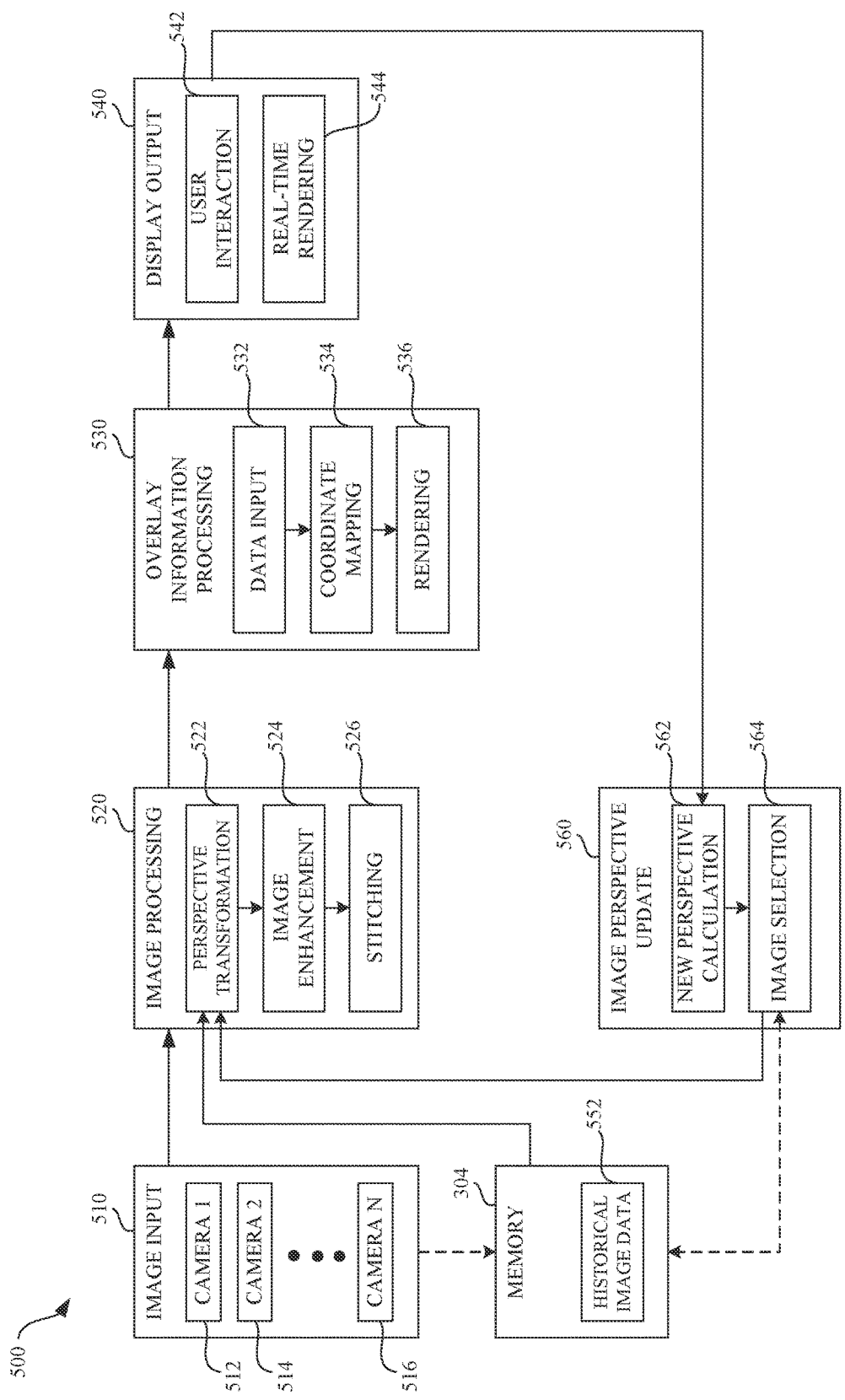
FIG. 5 illustrates a system diagram for view creation in accordance with one or more implementations of the subject technology.

FIG. 5 illustrates a system diagram 500 for view creation in accordance with one or more implementations of the subject technology. The system diagram 500 includes an image input component 510 that receives image data from cameras 512, 514 and 516 and feeds the image data to an image processing component 520. The image processing component 520 includes perspective transformation component 522, image enhancement component 524 and stitching component 526. The image processing component 520 feeds its output to overlay information processing component 530. The overlay information processing component 530 includes data input component 532, coordinate mapping component 534 and rendering component 536. The overlay information processing component 530 feeds its output to a display output component 540. In one or more implementations, the display output component 540 may be, or include at least a portion of, or be connected to a display device of the vehicle 100, such as the infotainment display system 160. The display output component 540 includes user interaction component 542 and real-time rendering component 544. In one or more implementations, the user interaction component 542 may receive user interactions via the infotainment display system 160 and analyze these user interactions to generate user interaction information.

The user interaction component 542 may supply the user interaction information to image perspective update component 560. The image perspective update component 560 includes new perspective calculation component 562 and image selection component 564. The new perspective calculation component 562 may process the user interaction information received from the user interaction component 542. The image selection component 564 may supply its image selection information to the perspective transformation component 522 for modifying the perspective view of the selected image(s). The image input component 510 may supply image data to be stored as historical image data 552 in the memory 304. In one or more implementations, the historical image data 552 may be similar to the historical image data described with reference to FIGS. 3 and 4. The memory 304 may be accessed by the image perspective update component 560 through one or more read operations to retrieve one or more segments of the historical image data for modifying the perspective view of the retrieved one or more segments of the historical image data. As described with reference to FIG. 3, the memory 304 is located onboard the vehicle 100. In other implementations, the memory 304 may be located, at least in part, external to the vehicle 100 and may be, at least in part, accessible to the vehicle 100 via a wireless network.

In some aspects, the image input component 510 may receive input images from cameras 512, 514 and/or 516, or from other image sources. The image input component 510 may perform initialization by initializing sub-components included in the image input component 510 and set up the sub-components, including cameras (e.g., cameras 512, 514, 516), sensors, and processing units. The image input component 510 may capture images from the cameras 512, 514, 516, which may be mounted on the vehicle 100. These cameras may provide different perspectives of the surrounding environment. In some aspects, the image input component 510 may preprocess the captured images to enhance their quality and prepare them for further analysis such as by the image processing component 520. This may involve tasks such as noise reduction, image stabilization, and color correction. In some aspects, the image input component 510 may perform camera calibration to ensure accurate measurements and alignments between the cameras 512, 514, 516. This calibration process can help in achieving precise perspective transformations and stitching of the images. In some aspects, the image input component 510 may utilize computer vision algorithms and sensor data, such as inertial measurement unit (IMU) to estimate the vehicle's pose (e.g., position and orientation) in the world coordinate system.

In some implementations, the perspective transformation component 522 may apply mathematical transformations to captured images based on a desired perspective view. This transformation can adjust the images to simulate the viewpoint from an arbitrary angle or position, allowing for a dynamic visual representation. The perspective transformation component 522 may calculate a perspective transformation matrix based on the desired viewpoint or angle for the new perspective view. This matrix can define the geometric transformation required to map the captured images onto the desired perspective view. The perspective transformation component 522 may also transform image coordinates by applying the perspective transformation matrix to the image coordinates of each pixel in the captured images.

This transformation recalculates the positions of the pixels in the new perspective view, accounting for the desired viewpoint. The perspective transformation component 522 also may perform interpolation to estimate the pixel values in the new perspective view for areas where direct pixel mappings are not available. In some aspects, the perspective transformation component 522 may apply certain interpolation techniques, such as bilinear or bicubic interpolation, to help fill in the missing pixel information and produce a smooth and visually coherent perspective view.

In some implementations, the image processing component 520 may augment the historical image data received from the memory 304 with additional parameters, such as speed and IMU data. By incorporating these factors, the image processing component 520 can derive information to enhance the visualization of areas that are momentarily out of sight but were previously visible. The image processing component 520 utilize the vehicle's speed to calculate the distance traversed within a specific time frame. By knowing the vehicle speed, the image processing component 520 can estimate how many meters or centimeters the vehicle would have traversed in a given duration. Leveraging this speed and/or IMU data, the image processing component 520 can integrate the information collected earlier from at least one of the cameras via the image input component 510. This allows the image processing component 520 to bridge the visibility gap and seamlessly incorporate the relevant pixel information into the region currently out of sight. By "slipping" this data into the appropriate region, the image processing component 520 can generate a continuous and comprehensive view, even in areas temporarily obscured from direct vision.

The image processing component 520 can harness the IMU data, which provides measurements of the vehicle's pitch, roll, and yaw. This information can be used to identify the vehicle's orientation and dynamic movements. For instance, if the vehicle encounters an abrupt incline, such as a rock, the positioning of the pixels depicting the underneath of the vehicle may be adjusted. In this scenario, the image data corresponding to the view underneath the vehicle may be applied with compression or expansion based on the vehicle's pose.

In some implementations, metadata may be integrated within the image data. The metadata may enable the image processing component 520 to identify specific frames and extract information for enhanced processing. Within the metadata, various entries may be included that provide insights into the content of each image frame. For example, the metadata may include geolocation information for identifying a corresponding geographical location of where an image was captured by one of the cameras 512, 514, or 516. These entries can range from identifying the type of content contained within a particular frame to any other pertinent information that proves useful for the camera system's operation. The image frames containing metadata can be linked and tagged with its relevant timestamp and pose, which may allow the image processing component 520 to associate a specific frame with a given timestamp and the current pose of a corresponding camera on the vehicle, providing a comprehensive understanding of a captured scene. This enables the image processing component 520 to retrieve and utilize specific frames from the historical image data 552 of a certain location in the past, granting it a temporal perspective on the scene.

In some implementations, the image enhancement component 524 may enhance the quality, clarity, or color of the transformed images to restore fine details and improve overall image quality. For example, the image enhancement component 524 may gather input parameters required for the image enhancement process, which may include the captured images from the vehicle's cameras or any other image source. The image enhancement component 524 may preprocess the captured images to prepare them for enhancement. This may involve tasks such as noise reduction, image denoising, contrast adjustment, and sharpening. The image enhancement component 524 may perform color correction techniques to ensure accurate color representation in the transformed images, which may involve adjusting white balance, color saturation, and other color-related parameters to achieve a more realistic and visually pleasing result. The image enhancement component 524 may adjust the image exposure to optimize brightness and contrast levels, which may involve techniques such as histogram equalization or adaptive exposure adjustment algorithms to enhance the visibility of details in both dark and bright regions of the transformed images. The image enhancement component 524 may apply image filtering algorithms to reduce noise and enhance image details, which may include techniques such as spatial filtering, edge-preserving smoothing, or frequency domain filtering to improve image clarity and sharpness. The image enhancement component 524 may perform dynamic range compression to balance the brightness levels across different areas of the image, which can help to retain details in both the shadows and highlights, avoiding underexposed or overexposed regions in the transformed images. The image enhancement component 524 may apply deblurring or sharpening algorithms to enhance image sharpness and reduce blurriness caused by motion or lens imperfections.

In some implementations, the stitching component 526 may combine or stitch together multiple transformed images to create a panoramic or 360-degree surround view. The stitching component 526 may align the images from each camera (e.g., cameras 512, 514, 516) into a single panoramic image, where the images are blended together to create a seamless complete view of the surrounding environment. This process requires not only understanding the camera poses but also understanding the content of each image and how it relates to the other images. In some aspects, stitching together images from different camera sources and angles involves technical concepts, including camera calibration, feature extraction and matching, homography estimation, and image blending.

In camera calibration, each camera may have its own unique set of intrinsic parameters that determine how it captures the scene. The image processing component 520 may perform the camera calibration by determining these parameters, including the focal length, principal point, and distortion coefficients, which can be used for accurately stitching images together. In feature extraction and matching, the stitching component 526 may find the corresponding points or features between different images to stitch images together. The stitching component 526 may perform the feature extraction by identifying distinctive points or areas in each image, while feature matching involves finding corresponding features across multiple images. For example, the stitching component 526 may need to extract features from the images, such as identifying key points or edges, to help with alignment and stitching.

The stitching component 526 may perform the homography estimation to compute the transformation between the images once corresponding features have been identified between two or more images. Homography is a mathematical model that describes the relationship between two planes in 3D space, which is used to warp and align the images. After the images have been aligned, image blending is used to create a seamless transition between the stitched images. This involves blending the overlapping regions of the images together to create a seamless, natural-looking panorama. Accordingly, stitching together images from different camera sources and angles may require a combination of image processing, computer vision, and mathematical techniques, as well as an understanding of the intrinsic properties of cameras and how they capture images.

In some aspects, the overlay information processing component 530 can generate the overlay information to be displayed on the transformed images. In one or more implementations, the overlay information may refer to adding additional visual elements, such as text, graphics, or icons onto an image to provide context, annotations, or enhance the visual representation of the image. For example, the overlay information may be implemented as image effects, virtual objects, icons, symbols, graphs, charts, captions, labels, watermarks, or the like. The data input component 532 may receive the overlay information, such as navigation information, vehicle status, points of interest, or other relevant data sources. The coordinate mapping component 534 may map the overlay information to the corresponding transformed image coordinates based on the perspective transformation. In some aspects, given the camera calibration parameters and the 3D scene information, the overlay information processing component 530 may perform coordinate transformations to map the overlay information onto the desired perspective view, which may involve converting the overlay information from its original coordinate system to the coordinate system of the target perspective view. In some implementations, the overlay information processing component 530 may utilize perspective projection techniques to project the overlay information from the 3D world coordinates onto the two-dimensional (2D) image plane of the desired perspective view as part of the coordinate mapping subprocess. This projection process may consider the camera parameters, such as the focal length, image sensor size, and camera position and orientation.

In some implementations, the rendering component 536 may render the overlay information onto the transformed images at the mapped coordinates. For example, the rendering component 536 may clip the projected overlay information to the boundaries of the perspective view to ensure that only the relevant portion is displayed. The rendering component 536 may apply rendering techniques, such as alpha blending, to integrate the overlay information with the underlying image.

In some implementations, the display output component 540 may be, or include at least a portion of, the infotainment display system 160 (as described with reference to FIG. 1) to provide for display the transformed and stitched images with overlay information via the infotainment display system 160. The user interaction component 542 may enable user interaction to adjust the infotainment display system 160 or control the perspective view, overlay information display, or trigger image perspective updates. The real-time rendering component 544 may dynamically update the displayed images with overlay information in response to user input or perspective updates, providing a real-time interactive experience.

In some implementations, the image perspective update component 560 may determine the need for an image perspective update based on user input or other criteria. For example, the user interaction component 542 may provide user interaction information that indicates a user selection of a new perspective view using the infotainment display system 160. The new perspective calculation component 562 may receive the user interaction information from the user interaction component 542 and calculate the new perspective parameters, such as camera position and orientation, based on the user interaction information or predefined settings. The image selection component 564 may identify the relevant images in the existing dataset that require perspective transformation. For example, the image selection component 564 may look up and retrieve the relevant images from the historical image data 552 in the memory 304. As such, the image selection component 564 may send an indication and/or request to the perspective transformation component 522 to apply mathematical transformations to the selected images based on the new calculated perspective view.

Figure 6:
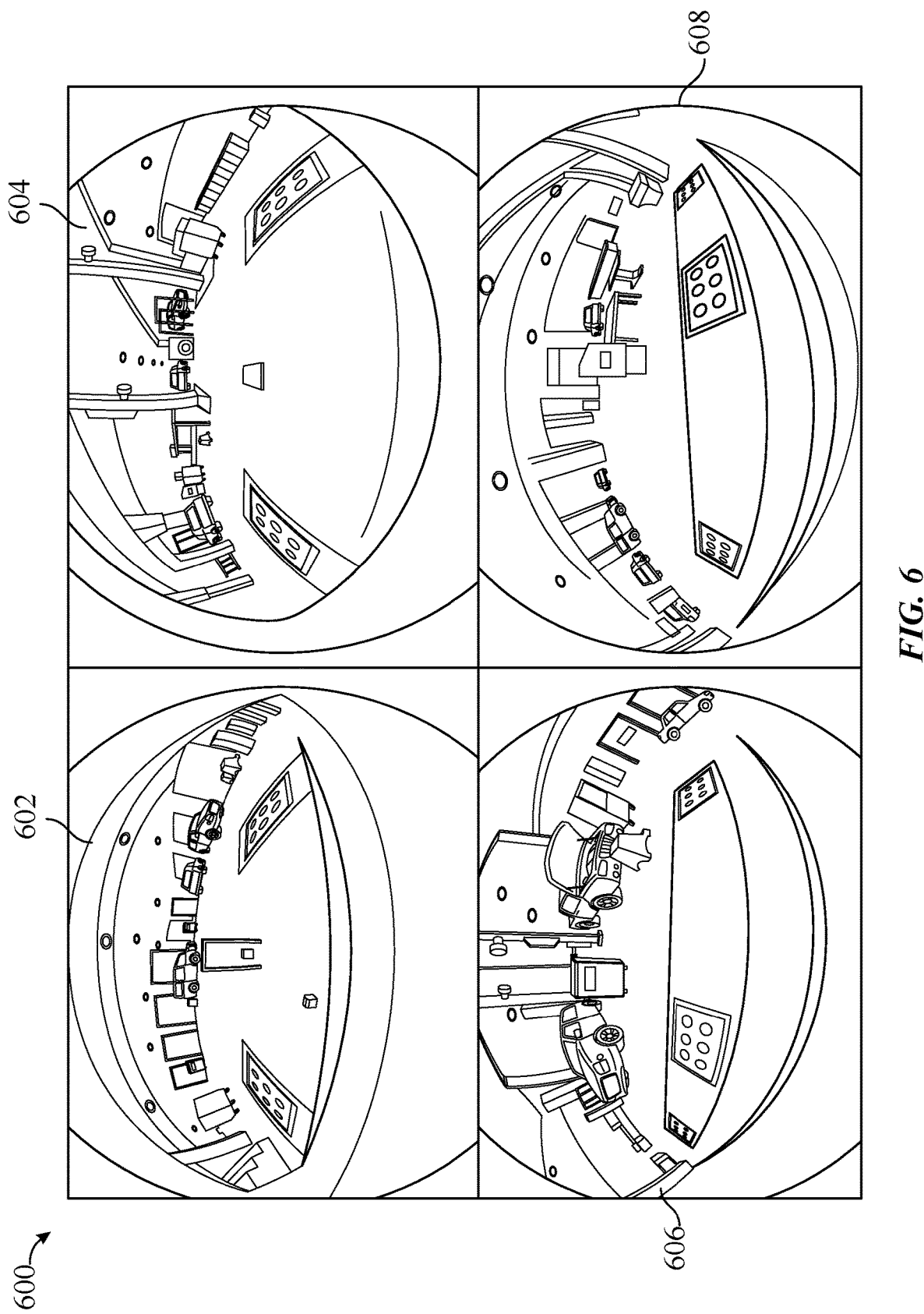
FIG. 6 illustrates an example of views from different perspective views in accordance with one or more implementations of the subject technology.

FIG. 6 illustrates an example of views from different perspective views in accordance with one or more implementations of the subject technology. These views are depicted through four fish lens images. These images provide a visual representation of how the camera system captures the surroundings from various vantage points. These images 602-508 may each serve as an original raw image prior to any perspective transformation and/or stitching operation.

In a first fish lens image 602, the view from the front of the vehicle can be observed. This perspective view may offer a comprehensive look at what lies ahead, allowing the driver to anticipate obstacles or potential hazards in the vehicle's path. In a second fish lens image 604, the view from the rear of the vehicle can be observed. This perspective view may offer information about the vehicles and objects in close proximity, aiding in safe maneuvering of the vehicle in drive mode and parking. A third fish lens image 606 illustrates the view from the left side of the vehicle. This perspective view may enable the driver to gain insight into adjacent lanes and monitor any approaching vehicles or pedestrians from that direction. A fourth fish lens image 608 may provide the view from the right side of the vehicle. This perspective view may complement the left-side view by offering a comprehensive understanding of the vehicle surroundings.

By combining these different perspective views with a stitching operation, the camera system can provide an encompassing 3D surround view from the vehicle's vantage point, enhancing situational awareness and significantly improving the overall driving experience. These fish lens images may exemplify the camera system's capability to capture and process real-time information from multiple angles. As described with reference to FIGS. 1-4, the images 602-508 may be applied with a perspective transformation to adjust each of the images' original perspective such as from the vehicle's perspective to a desired perspective view. This can be illustrated with reference to the camera views described in FIG. 7.

Figure 7:
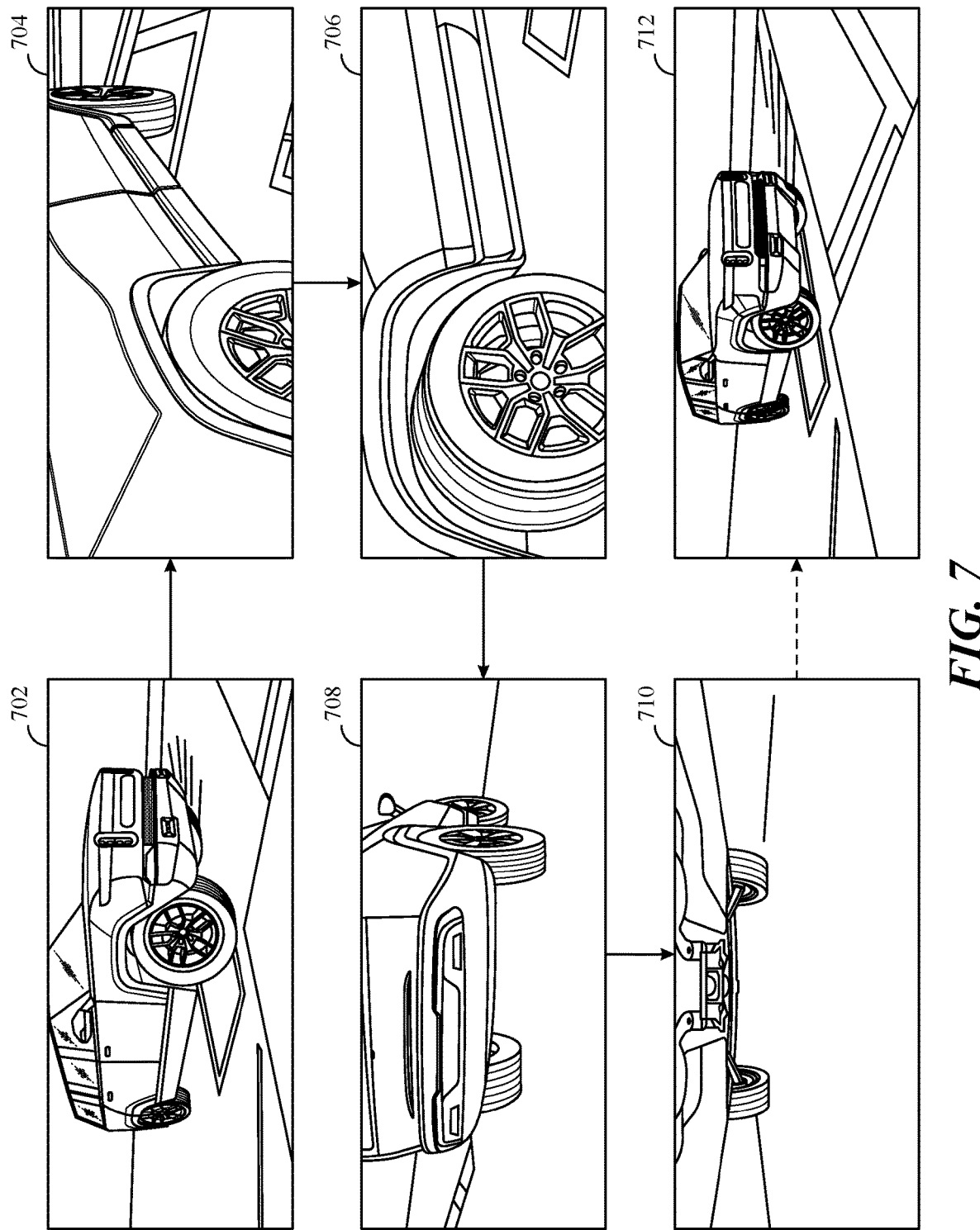
FIG. 7 conceptually illustrates examples of views of surroundings of a vehicle from different perspective views in accordance with one or more implementations of the subject technology.

FIG. 7 conceptually illustrates examples of different views of surroundings of a vehicle (e.g., the vehicle 100) being observed from different perspective views in accordance with one or more implementations of the subject technology. FIG. 7 includes a first view 702 of the vehicle 100 observed from a first perspective view, a second view 704 observed from a second perspective view, a third view 706 observed from a third perspective view, a fourth view 708 observed from a fourth perspective view, a fifth view 710 observed from a fifth perspective view, and a sixth view 712 observed from a sixth perspective view.

Each of the views 702-712 may include a stitched image comprised of more than two images to provide a panoramic visualization of the surroundings of the vehicle. In some implementations, the image representation of the vehicle may be a computer-generated rendering that is placed in the scene observable from each of the different perspective views.

Initially, an original image is captured by a camera located on or within the vehicle, providing an original perspective view. This original image represents the scene as viewed from the camera's position (e.g., from the vehicle's perspective). As illustrated in FIG. 7, each of the views 702-712 may include at least a portion of the original image but observed from a different perspective view. The portions of the view 702 that correspond to the original image may include pixel coordinates illustrating the surroundings of the vehicle. In some aspects, the portions of the view that correspond to the original image may include pixel coordinates illustrating the surroundings of the vehicle that undergo a mathematical transformation to modify the appearance of the surroundings of the vehicle in the original perspective by assuming the new position of the surroundings of the vehicle and simulating the appearance of the surroundings of the vehicle in the desired perspective view. For example, the surroundings of the vehicle in each of the views 702-712 may be a stitched image derived from multiple original images of the surrounding scene applied with a perspective transformation that simulates the desired perspective view.

To enable this perspective shift in the original image, the camera system employs advanced image processing techniques and mathematical algorithms. For example, the camera system applies a mathematical transformation, specifically a perspective transformation, to the original image. This transformation accounts for the relative positions and orientations of the camera and the desired vantage point. By using mathematical calculations, the camera system can adjust the perspective view of the original image to match the desired first perspective view.

Once the perspective transformation is applied, the resulting image represents the view of the surroundings of the vehicle from the first perspective view, including at least a partial view of the vehicle. This transformed image provides an accurate representation of how the surroundings of the vehicle appears from the selected vantage point. The transformed image may be displayed on a dedicated screen or integrated into the vehicle's infotainment system, allowing the driver to view the surroundings of the vehicle from the first perspective view. This can provide information about the surroundings, obstacles, and other relevant objects in the vicinity of the vehicle.

The view 702 depicts the side of the vehicle and its surroundings from an angled vantage point looking up toward the front side of the vehicle. The view 704 may depict a visualization of the surroundings of the vehicle that changes from the first perspective view depicted in the view 702 to the second perspective view depicted in the view 704 based on a user interaction, via the infotainment display system 160, with the view 702 indicating a selection of view to the second perspective view. As described with reference to FIG. 4, user interaction data may trigger a new perspective view calculation and a perspective transformation operation to be performed on new image data or historical image data, or a combination thereof, that results in the second perspective view being provided in the view 704. For example, the user interaction may correspond to a finger swipe and drag motion on the infotainment display system 160 that triggers the perspective view to shift between the first and second perspective views. As illustrated in FIG. 7, the view 704 depicts the right side of the vehicle and its surroundings from an elevated vantage point looking down toward the bottom of the vehicle.

The view 706 may depict a visualization of the vehicle and its surroundings that changes from the second perspective view depicted in the view 704 to the third perspective view depicted in the view 706 based on a user interaction, via the infotainment display system 160, with the view 704 indicating a selection to the third perspective view. Similarly, the user interaction with the view 704 triggers a new perspective transformation on the image data to provide the third perspective view depicted in the view 706. For example, the user interaction may correspond to another finger swipe and drag motion on the infotainment display system 160 that triggers the perspective view to shift between the second and third perspective views. As illustrated in FIG. 7, the view 706 depicts a zoomed-in visualization of the right side of the vehicle from an elevated vantage point zooming in toward the right rear wheel.

The view 708 may depict a visualization of the vehicle and its surroundings that changes from the third perspective view depicted in the view 706 to the fourth perspective view depicted in the view 708 based on a user interaction, via the infotainment display system 160, with the view 706 indicating a selection to the fourth perspective view. Similarly, the user interaction with the view 706 triggers a new perspective transformation on the image data to provide the fourth perspective view depicted in the view 708. For example, the user interaction may correspond to another finger swipe and drag motion on the infotainment display system 160 that triggers the perspective view to shift between the third and fourth perspective views. As illustrated in FIG. 7, the view 708 depicts the rear of the vehicle from a low vantage point looking up toward the undercarriage of the vehicle.

The view 710 may depict a visualization of the vehicle and its surroundings that changes from the fourth perspective view depicted in the view 708 to the fifth perspective view depicted in the view 710 based on a user interaction, via the infotainment display system 160, with the view 708 indicating a selection to the fifth perspective view. Similarly, the user interaction with the view 708 triggers a new perspective transformation on the image data to provide the fifth perspective view depicted in the view 710. For example, the user interaction may correspond to another finger swipe and drag motion on the infotainment display system 160 that triggers the perspective view to shift between the fourth and fifth perspective views. As illustrated in FIG. 7, the view 710 depicts the undercarriage and surroundings beneath the vehicle from a low vantage point looking toward the front of the vehicle.

The view 712 may depict a visualization of the vehicle and its surroundings that changes from the fifth perspective view depicted in the view 710 to the sixth perspective view depicted in the view 712 based on a user interaction, via the infotainment display system 160, with the view 710 indicating a selection to the sixth perspective view. Similarly, the user interaction with the view 710 triggers a new perspective transformation on the image data to provide the sixth perspective view depicted in the view 712. For example, the user interaction may correspond to another finger swipe and drag motion on the infotainment display system 160 that triggers the perspective view to shift between the fifth and sixth perspective views. As illustrated in FIG. 7, the view 712 depicts the side of the vehicle and its surroundings from an angled vantage point looking toward the front side of the vehicle at a more zoomed out position relative to the view 702.

Terrain View

The subject technology also relates to enhancing a vehicle's drivability when navigating complex terrains, particularly off-road situations that require a second party to guide the vehicle. Such terrains often present various specific challenges such as rocks and other potentially damaging elements. It is important to ensure that the vehicle's tires traverse level ground as much as possible to avoid tire or underbody damages. Additionally, situations may arise where the vehicle's tire is about to fall off a rock, and it becomes vital to have awareness of the timing and potential damage to the undercarriage of the vehicle in such instances.

One of the challenges faced with prior approaches attempting to address driving visibility is the lack of resolution and visibility of the terrain underneath the vehicle, as well as to the sides of the vehicle in areas directly in contact with the wheel and tire placement. While these prior approaches provide a 360-degree view and other perspectives, there is a clear gap in providing detailed information about the underside of the vehicle and the areas adjacent to the wheel placement. By incorporating side views in the subject technology, users can determine the proximity of the vehicle's exterior body to objects that are approximately a foot or a foot and a half away from the vehicle's limits. The terrain view feature of the subject technology can overlay both the forward trajectory of the rear tires and the front tire trajectory. Moreover, the subject technology can extend the view beyond the front mirror's perspective, providing insight into the space between the front mirror and the rear of the vehicle, directly underneath the vehicle.

The subject technology provides for a camera system that creates a terrain view feature that enables users to have an enhanced visual perception of their surroundings while operating a vehicle. By utilizing a combination of camera feed stitching techniques, this terrain view feature provides users with a comprehensive view ahead, underneath, and to the sides of the vehicle. The camera feed captures image data from the front and sides of the vehicle, which are then seamlessly merged to create a single, comprehensive image that showcases the forward view, underbody view, and side view. By integrating these different perspectives, users can gain a holistic understanding of the terrain and potential obstacles surrounding their vehicle. By overlaying tire placement and trajectory guidelines onto the stitched image, users can observe the area between the front side mirrors and a specified distance ahead of the vehicle's current path. This area may correspond to the space covered by the front hood of the vehicle. The terrain view feature also can highlight any obstacles that may pose a potential collision risk to the vehicle's front or rear tires. These detected obstacles can be visually emphasized on the display, ensuring that users are aware of their presence.

The subject technology can capture a visual image of the terrain ahead of the vehicle and transforming that visual image sideways angle into a top-down perspective, representing the terrain from above. This process can be performed at various speeds of the vehicle, either while moving forward or backward. As the vehicle progresses, the captured image can be gradually shifted backward to create a representation of the terrain underneath the vehicle. Additionally, aspects such as trajectory and obstacle detection can be incorporated, leveraging techniques similar to those used with rear-view cameras when the vehicle is put into a reverse mode. Object detection, sharp edge detection, and highlighting can be employed to create a map that assists the vehicle in navigating through obstacles.

The subject technology can provide a dynamic presentation of an overlay trajectory and an underbody view where all tires can be overlaid (e.g., superimposed over pixel coordinates of the underlying image). The subject technology can further provide obstacle detection and highlighting in the camera feed, utilizing the captured 2D or 3D views to identify sharp edges such as rocks and overlaying them with boxes or other indicators to draw attention to users. In some aspects, specific objects can be zoomed in on, allowing users to identify potential contact points, such as with the rear tires.

In one or more implementations, the subject system may receive a route request to provide a route projection for a vehicle. The subject system may receive, by a processor, first data from a first camera of the vehicle and second data from a second camera of the vehicle. In some aspects, the first data includes an image representation of a scene in a first field of view and the second data includes an image representation of the scene in a second field of view. The subject system also may create, by the processor, a stitched image representing the scene in a combined field of view by stitching the first data having the first field of view with the second data having the second field of view. In some aspects, the stitched image can be provided with overlay information mapped to pixel coordinates of the stitched image. The subject system also can provide, for display, a terrain view that includes the stitched image. In some aspects, the terrain view may be displayed in one of a plurality of selectable views based on a driving mode of the vehicle. In some aspects, the overlay information in the terrain view may indicate a representation of at least a portion of the vehicle in the route projection.

Figure 8:
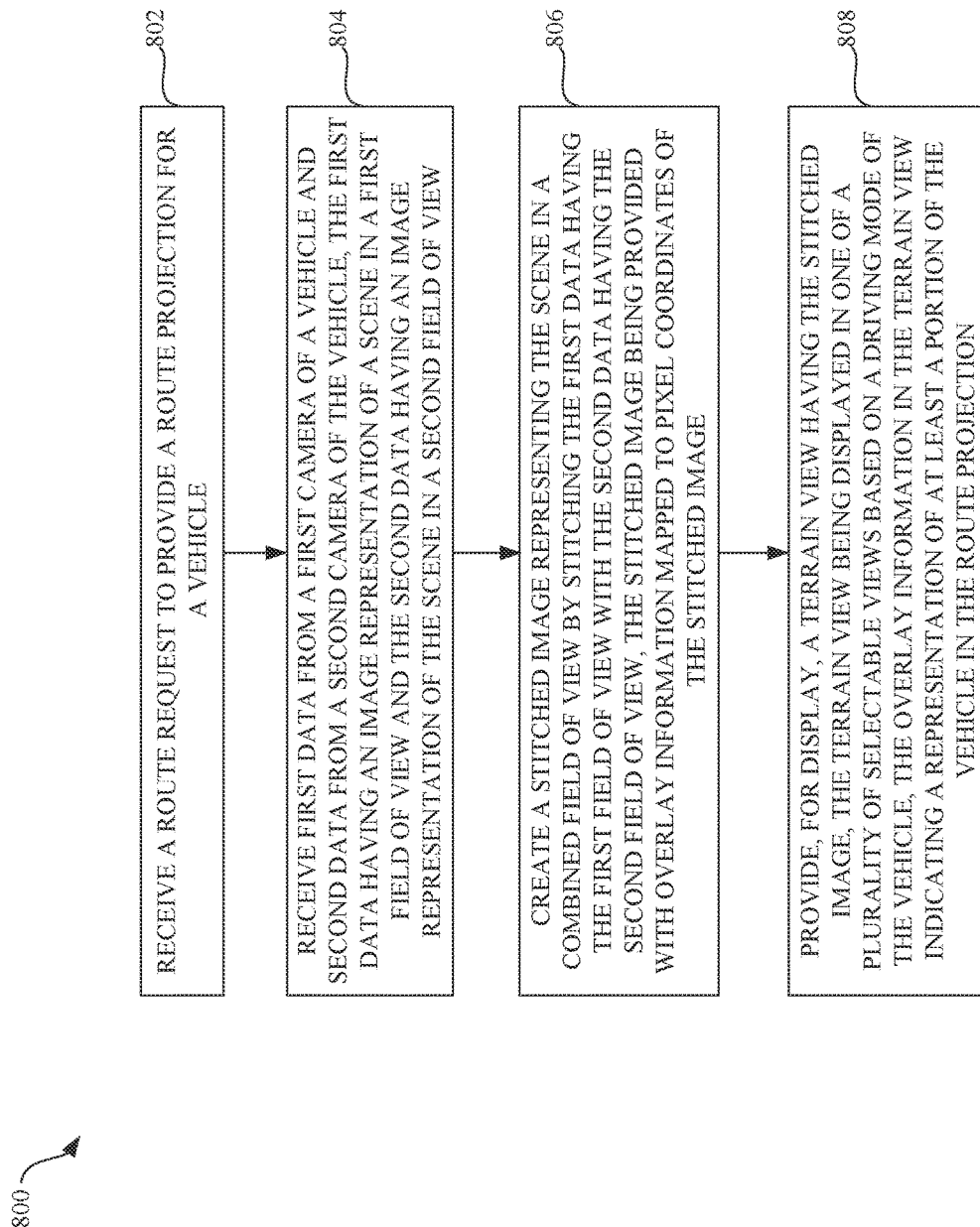
FIG. 8 illustrates a flow diagram of an example process for view creation of terrain view locations in accordance with one or more implementations of the subject technology.

FIG. 8 illustrates a flow diagram of an example process 800 for view creation of terrain view locations in accordance with one or more implementations of the subject technology. For explanatory purposes, the process 800 is primarily described herein with reference to the vehicle 100 of FIGS. 1-3, and/or various components thereof. However, the process 800 is not limited to the vehicle 100 of FIG. 1, and one or more steps (or operations) of the process 800 may be performed by one or more other structural components of the vehicle 100 and/or of other suitable moveable apparatuses, devices, or systems. Further, for explanatory purposes, some of the steps of the process 800 are described herein as occurring in serial, or linearly. However, multiple steps of the process 800 may occur in parallel. In addition, the steps of the process 800 need not be performed in the order shown and/or one or more steps of the process 800 need not be performed and/or can be replaced by other operations.

At step 802, the processor 302 may receive, from a user via a user interface of the vehicle 100, a route request to provide a route projection for the vehicle 100. For example, the route request may correspond to user input selecting navigation guidance from a starting location of the vehicle 100 to a destination location at the conclusion of the navigation guidance. The route projection may be the navigation guidance presented as a map with an indication of a location of the vehicle 100 relative to the map.

At step 804, the processor 302 may receive first data from a first camera of the vehicle 100 and second data from a second camera of the vehicle 100. In some aspects, the first data may be image data that includes an image representation of a scene in a first field of view and the second data may include an image representation of the scene in a second field of view. The first field of view and the second field of view may to correspond to different portions of a scene. In some aspects, the image representation in each of the first data and the second data may correspond to a same viewing angle representing the perspective from the vehicle 100. In other aspects, the image representation in each of the first data and the second data may correspond to different viewing angles representing different perspectives from the vehicle 100.

At step 806, the processor 302 may create a stitched image representing the scene in a combined field of view by stitching the first data having the first field of view with the second data having the second field of view. In one or more implementations, the stitched image may be created using an AI model, such as a trained machine learning stitching algorithm. In some aspects, the stitched image is provided with overlay information mapped to pixel coordinates of the stitched image.

At step 808, the processor 302 may provide for display, via the infotainment display system 160, a terrain view that includes the stitched image. In some aspects, the terrain view is displayed in one of multiple selectable views based on a driving mode of the vehicle. In some aspects, at least one of the selectable views includes the stitched image having an image representation of a transparent hood view superimposed with an image representation of at least a portion of the scene underneath of the vehicle. For example, a portion of the vehicle 100, such as the hood area of the vehicle 100, may be shown as a transparent representation that allows the ground beneath the vehicle 100 to be visible. Other selectable views may include a rear view of the vehicle 100 or a side view of the vehicle 100.

In some aspects, the overlay information in the terrain view indicates a representation of at least a portion of the vehicle 100 in the route projection. For example, overlay information may be generated and mapped to pixel coordinates of the stitched image as a separate layer superimposed over the stitched image at the pixel coordinates. In some aspects, the overlay information may provide route navigation and/or guidance information to a user to help the user determine vehicle placement when an obstacle is encountered along a projected route of the vehicle or in proximity to the surroundings of the vehicle. For example, the overlay information may include trajectory guidelines superimposed on at least a portion of the stitched image such as at the mapped pixel coordinates of the stitched image. In some aspects, the trajectory guidelines may indicate a projected trajectory of the vehicle to help guide the driver on how to avert a detected obstacle along the vehicle path.

In some implementations, the processor 302 may determine a driving mode of the vehicle 100. The driving mode may include, but not limited to, a park mode, a drive mode, a reverse mode, a sleep mode, and an idle mode. The processor 302 may select one of the multiple perspective views for a scene that are available to the vehicle 100 based on the driving mode of the vehicle 100. Accordingly, the processor 302 may provide for display the stitched image in the selected perspective view. For example, if the vehicle is in the drive mode, the selected perspective view may include a view of a terrain assumed to be located underneath the vehicle to provide visibility of any objects located in front of and/or under the vehicle 100 while the vehicle 100 is moving in a forward direction. In some aspects, the selected perspective view may provide a transparent hood view that visualizes the terrain in front of and/or underneath the vehicle while the image representation of the hood portion is transparent (or shown as an overlay outline representation) to the user.

In other aspects, the overlay information may include object detection information superimposed on at least a portion of the stitched image such as at the mapped pixel coordinates of the stitched image. In some aspects, the object detection information may indicate detection of one or more objects based on a proximity between a projected path of the vehicle and the one or more objects detected in the stitched image. For example, the overlay information may highlight or enhance the visual appearance of the object on the stitched image such that the detected object is prominently presented and provides an implied notification (which may be a visual signal using the infotainment display system 160 or an audio signal through an audio system of the vehicle 100) to alert the driver of the detected object's presence along the vehicle path. In some implementations, the vehicle 100 may provide for display a notification associated with the detection of the one or more objects. For example, the notification may include a multi-modal alert such as a written notification via a display associated with the display of the stitched image, an audible notification that occurs concurrently with the presentation of the detected objects, or the like.

Figure 9:
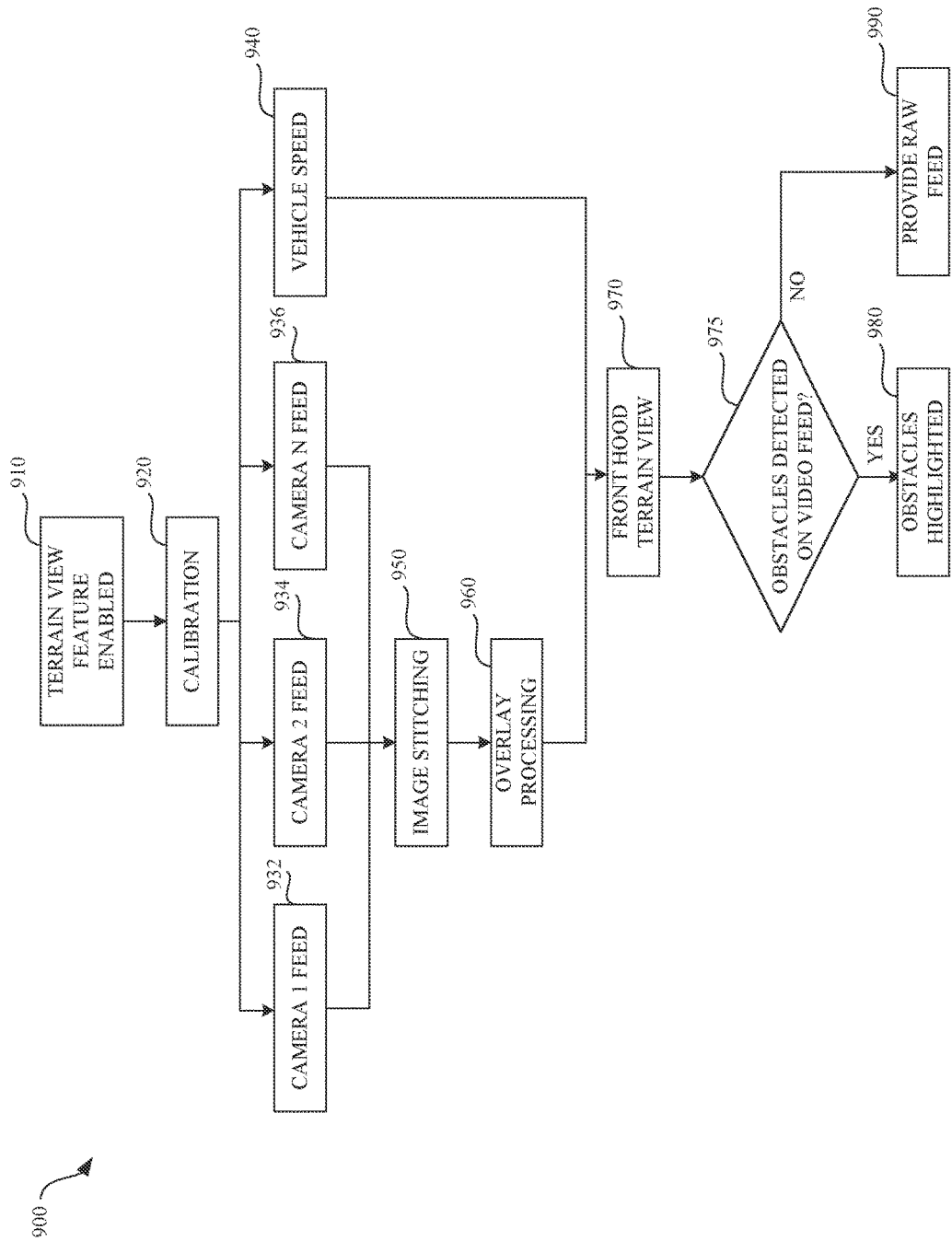
FIG. 9 illustrates a flow diagram of an example process flow for performing a terrain view feature on a vehicle in accordance with one or more implementations of the subject technology.

FIG. 9 illustrates a flow diagram 900 of an example process flow for performing a terrain view feature on a vehicle in accordance with one or more implementations of the subject technology. In some implementations, the process described with reference to FIG. 9 is intended to describe the subprocesses when the terrain view feature is enabled as described with reference to step 950 of FIG. 9, for example. At step 910, the terrain view feature is enabled. At step 920, a calibration is performed between cameras of a vehicle (e.g., the vehicle 100) to ensure the cameras are synchronized between each other to ensure an accurate stitching process. At steps 932, 934 and 936, image data (or data feeds) are retrieved from the cameras respectively. At step 940, a vehicle speed measurement is obtained.

At step 950, an image stitching process (as described with reference to at least FIGS. 4, 5, and 8) is performed on the image data retrieved from the cameras at steps 932, 934 and 936. In some aspects, a perspective transformation on the retrieved images may be performed (as described with reference to at least FIGS. 4-7) prior to the stitching operation at step 950. At step 960, an overlay processing is performed on the stitched image to provide overlay information superimposed on the underlying stitched image at mapped pixel coordinates of the stitched image.

At step 970, a transparent front hood terrain view in the forward view via the terrain view feature is provided. The rendering of the transparent hood view may also be based on the vehicle speed measurement such that historical image data can be indexed and retrieved for processing via perspective transformation, stitching, and/or overlay processing to provide accurate imaging as the vehicle is traversing along a projected route path.

At step 975, a determination is made as to whether obstacles are detected on the video feed. If obstacles are indeed detected, the detected obstacles are highlighted in step 980 to enhance their appearance via the terrain view feature. Otherwise, at step 990, a raw video feed is continued to be provided.

Figure 10:
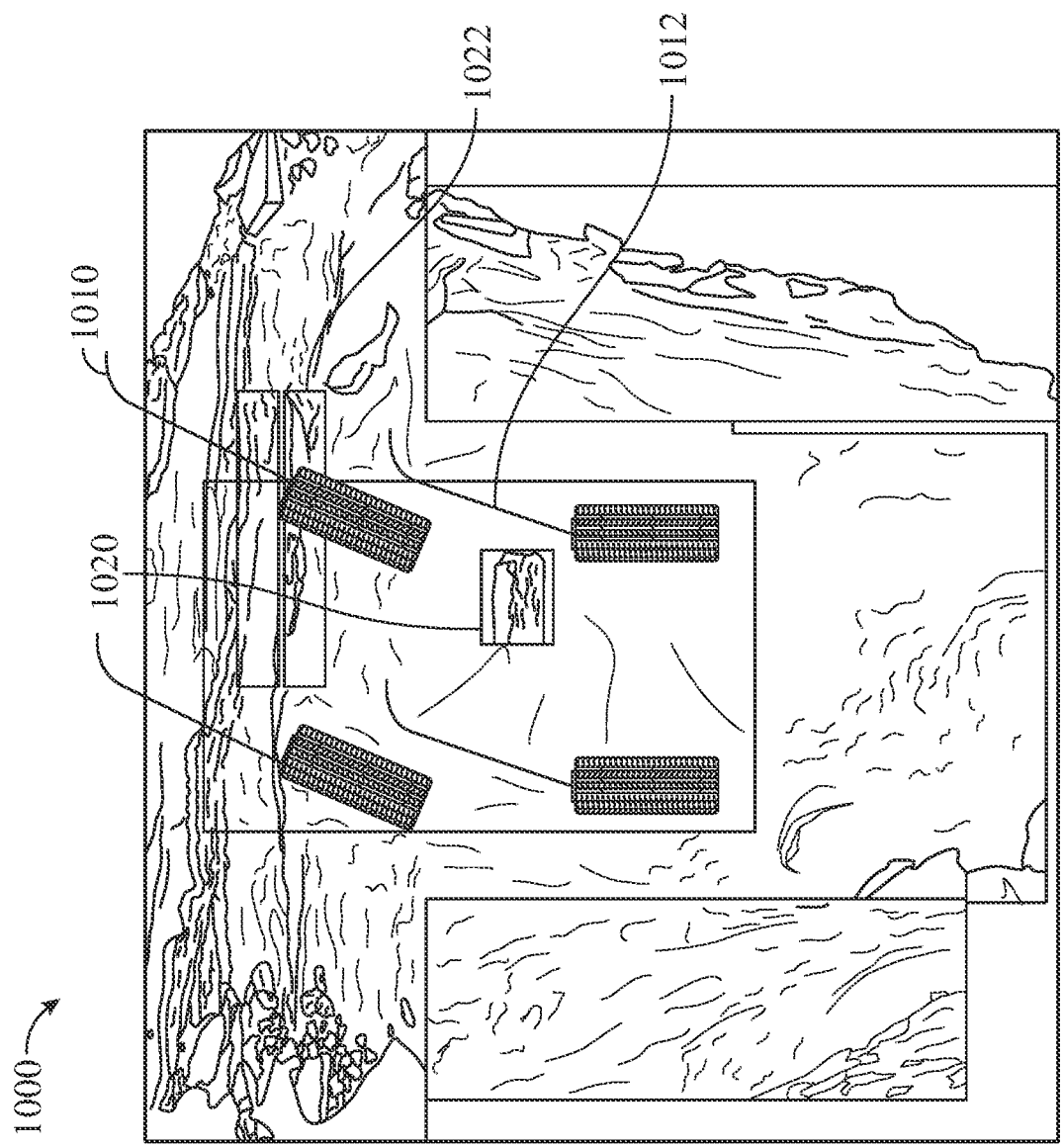
FIG. 10 conceptually illustrates an example of a view creation of terrain view locations with overlay information in accordance with one or more implementations of the subject technology.

FIG. 10 conceptually illustrates an example of a view creation 1000 of terrain view locations with overlay information in accordance with one or more implementations of the subject technology. The view creation 1000 depicts a three-dimensional visualization of different terrain locations surrounding a vehicle (e.g., the vehicle 100). The view creation 1000 provides a stitched image that includes images taken from multiple perspective views. The view creation

1000 also includes overlay information associated with one or more features of the vehicle 100.

In some implementations, the processor 302 may select one of multiple perspective views for a scene that are available to the vehicle 100 based on a driving mode of the vehicle 100. Accordingly, the processor may provide for display the stitched image in the selected perspective view. For example, if the vehicle is in the drive mode, the selected perspective view may include a view of a terrain underneath the vehicle to provide visibility of any objects located in front of and/or under the vehicle 100 while the vehicle 100 is moving in a forward direction. In some aspects, the selected perspective view may provide a transparent hood view that visualizes the terrain in front of and/or underneath the vehicle while the image representation of the hood portion is transparent (or shown as an overlay outline representation) to the user.

In some implementations, the stitched image is provided for display, via the infotainment display system 160, with overlay information representing at least a portion of the vehicle in the scene. Overlay information may be generated and mapped to pixel coordinates of the stitched image as a separate layer superimposed over the stitched image at the pixel coordinates. For example, view creation 1000 includes overlay objects representing front wheels and rear wheels of the vehicle 100 that include motion effects, such as pivoting left or right, in response to driving activity of the vehicle 100.

In some aspects, the overlay information may provide route navigation and/or guidance information to a user to help the user determine a path forward or rearward when an obstacle is encountered along a projected route of the vehicle or in proximity to the vehicle's surroundings. For example, the overlay information may include trajectory guidelines superimposed on at least a portion of the stitched image such as at the mapped pixel coordinates of the stitched image. As illustrated in FIG. 10, the view creation 1000 includes trajectory guidelines 1010 associated with the front axle of the vehicle 100 and includes trajectory guidelines 1012 associated with the rear axle of the vehicle 100. In some aspects, the trajectory guidelines 1010, 1012 may indicate a projected trajectory of the vehicle 100 to help guide the driver on how to avert a detected obstacle along the vehicle path.

In other aspects, the overlay information may include object detection information superimposed on at least a portion of the stitched image such as at the mapped pixel coordinates of the stitched image. In some aspects, the object detection information may indicate detection of one or more objects based on a proximity between a projected path of the vehicle 100 and the one or more objects detected in the stitched image. For example, the overlay information may highlight or enhance the visual appearance of the object on the stitched image such that the detected object is prominently presented and provides an implied notification to the driver of its presence along the vehicle path. As illustrated in FIG. 10, the view creation 1000 includes overlay information identifying a first object 1020, such as a rock, and a second object 1022, such as a set of boulders or rock formation. In some aspects, the detected objects may be highlighted or enhanced with a box-shaped outline and the outline may include a specified color to further enhance its appearance on the view creation 1000. In some implementations, the vehicle 100 may provide for display a notification associated with the detection of the one or more objects. For example, the notification may include a multi-modal alert such as a written notification via a display associated with the display of the stitched image, an audible notification that occurs concurrently with the presentation of the detected objects, or the like.

In some aspects, the processor 302 can process overlay information to be displayed on the transformed images. The processor onboard the vehicle 100 may receive overlay information, such as navigation information, vehicle status, points of interest, or other relevant data sources. The processor may map the overlay information to the corresponding transformed image coordinates based on the perspective transformation. In some aspects, the processor may perform coordinate transformations to map the overlay information onto the desired perspective view, which may involve converting the overlay information from its original coordinate system to the coordinate system of the target perspective view. In some implementations, the processor may utilize perspective projection techniques to project the overlay information from the 3D world coordinates onto the 2D image plane of the desired perspective view as part of the coordinate mapping subprocess. In some implementations, the processor may render the overlay information onto the transformed images at the mapped coordinates. For example, the processor may clip the projected overlay information to the boundaries of the perspective view to ensure that only the relevant portion is displayed.

In some implementations, the processor onboard the vehicle 100 may determine the need for an image perspective update based on user input or other criteria. For example, the processor may receive user interaction information that indicates a user selection of a new perspective view and may calculate the new perspective parameters, such as camera position and orientation, based on the user interaction information or predefined settings. As illustrated in FIG. 10, as the vehicle 100 is traversing the terrain and changing angles as the vehicle 100 progresses forward along the projected route, a new perspective may need to be calculated to provide the next scene from a different perspective view and/or the driver may select a different perspective view based on the visualization provided within the view creation 1000. In some aspects, the new calculated perspective view may be calculated based on one or more selected images from the historical image data 552 stored in the memory 304 accessible to the vehicle 100.

Figure 11:
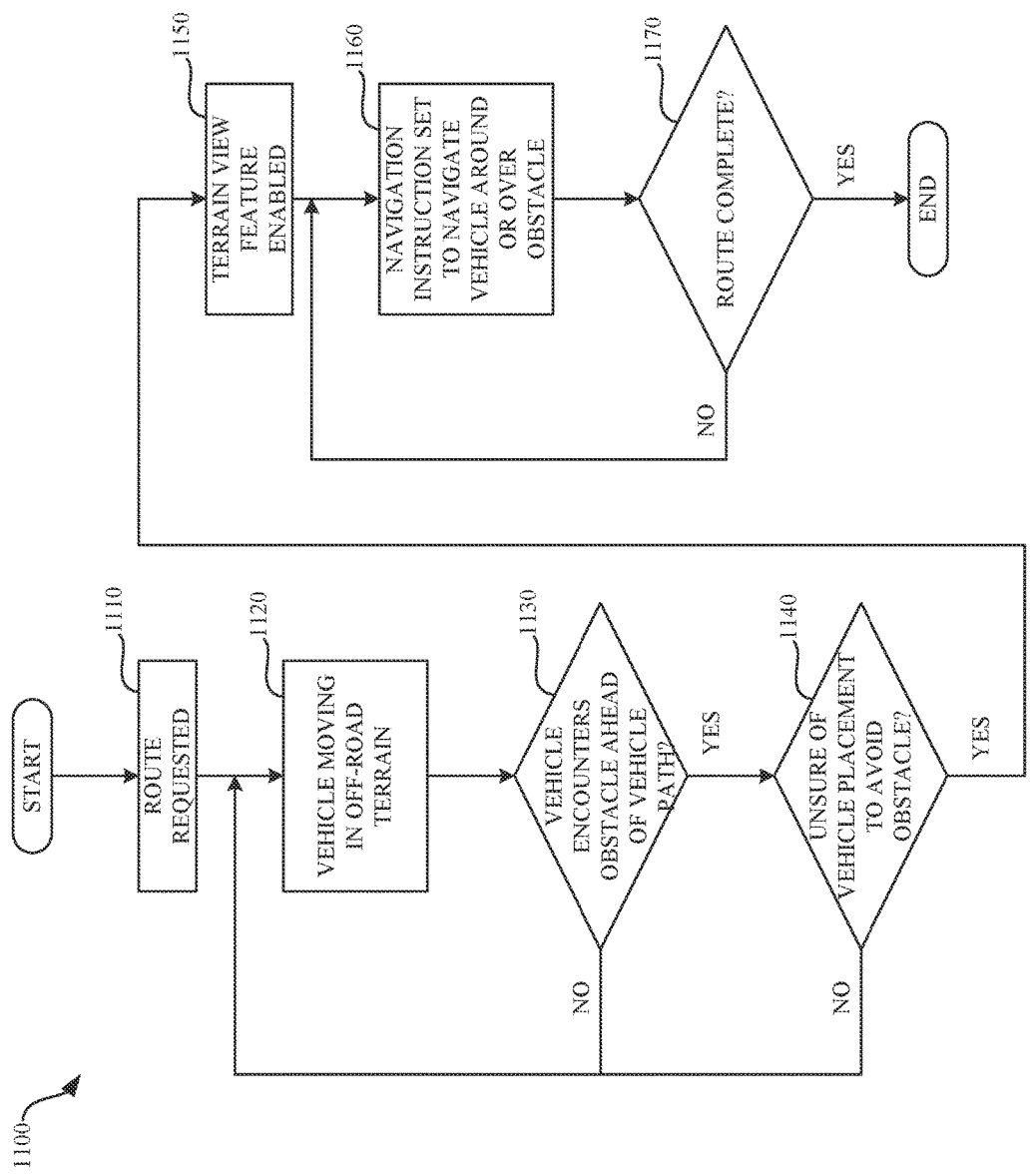
FIG. 11 illustrates a flow diagram of an example process flow for enabling a terrain view feature on a vehicle in accordance with one or more implementations of the subject technology.

FIG. 11 illustrates a flow diagram 1100 of an example process flow for enabling a terrain view feature on a vehicle in accordance with one or more implementations of the subject technology. At step 1110, a route is requested. For example, a navigational input may be received to initiate a route projection for a vehicle (e.g., the vehicle 110). At step 1120, the vehicle is detected to be moving (or at least traversing through) off-road terrain. At 1130, the processor 302 may determine whether the vehicle has encountered an obstacle that is located ahead of the vehicle path. If the obstacle is indeed detected ahead of the vehicle path, the process proceeds to step 1140. Otherwise, the process proceeds back to step 1120.

At step 1140, a determination is made, by the processor 302 of the vehicle 100, as to whether the driver of the vehicle is unsure of the vehicle placement to avoid the obstacle that is detected to be ahead of the vehicle path. In one or more implementations, the processor 302 may process vehicle data, such as duration of time the vehicle is in its current driving state and/or location, to calculate a metric indicating a likelihood that the driver is unsure of the vehicle placement. In one or more other implementations, the processor 302 may prompt the user via the infotainment display system 160, with a query asking whether the user is unsure of the vehicle placement. If the driver is indeed unsure of the vehicle placement, the process proceeds to step 1150. Otherwise, the process proceeds back to step 1120. At step 1150, a terrain view feature is enabled. For example, as described with reference to FIG. 12, the terrain view feature may be a view creation that provides a 360-degree surround view of terrain surrounding the vehicle along with overlay information that allows the driver to make informed decisions of the vehicle placement. In one or more implementations, the terrain view feature may be enabled automatically in response to the determination that the driver is unsure of the vehicle placement for avoiding the detected obstacle. In one or more other implementations, the terrain view feature is enabled in response to user interaction, where the user may input a selection via the infotainment display system 160 to activate the terrain view feature. In some aspects, the terrain view feature may be enabled and configurable with different levels of visibility. For example, the terrain view may be enabled with a first level of visibility that provides for display a forward-looking camera feed of the vehicle and a underbody camera feed of the vehicle. The first level of visibility also provides overlay information illustrating static placement of tire representations. In another example, the terrain view may be enabled with a second level of visibility that adds to the first level of visibility by providing overlay information with dynamic presentation of all wheel trajectories and also displays the underbody camera feed with all tires overlaid on the camera feed. In another example, the terrain view feature may be enabled with a third level of visibility that adds to the second level of visibility by providing obstacle detection highlights in one or more camera feeds and alert notifications of the detected obstacles, and also provides a driver display overlay on the camera feed.

At step 1160, the navigation instruction, based at least in part on the current vehicle placement along the route projection, may be set to navigate the vehicle 110 around or over the detected obstacle. At step 1170, a determination is made as to whether the route is complete. If the route is indeed complete, then the process ends. Otherwise, the process proceeds back to step 1160.

Figure 12:
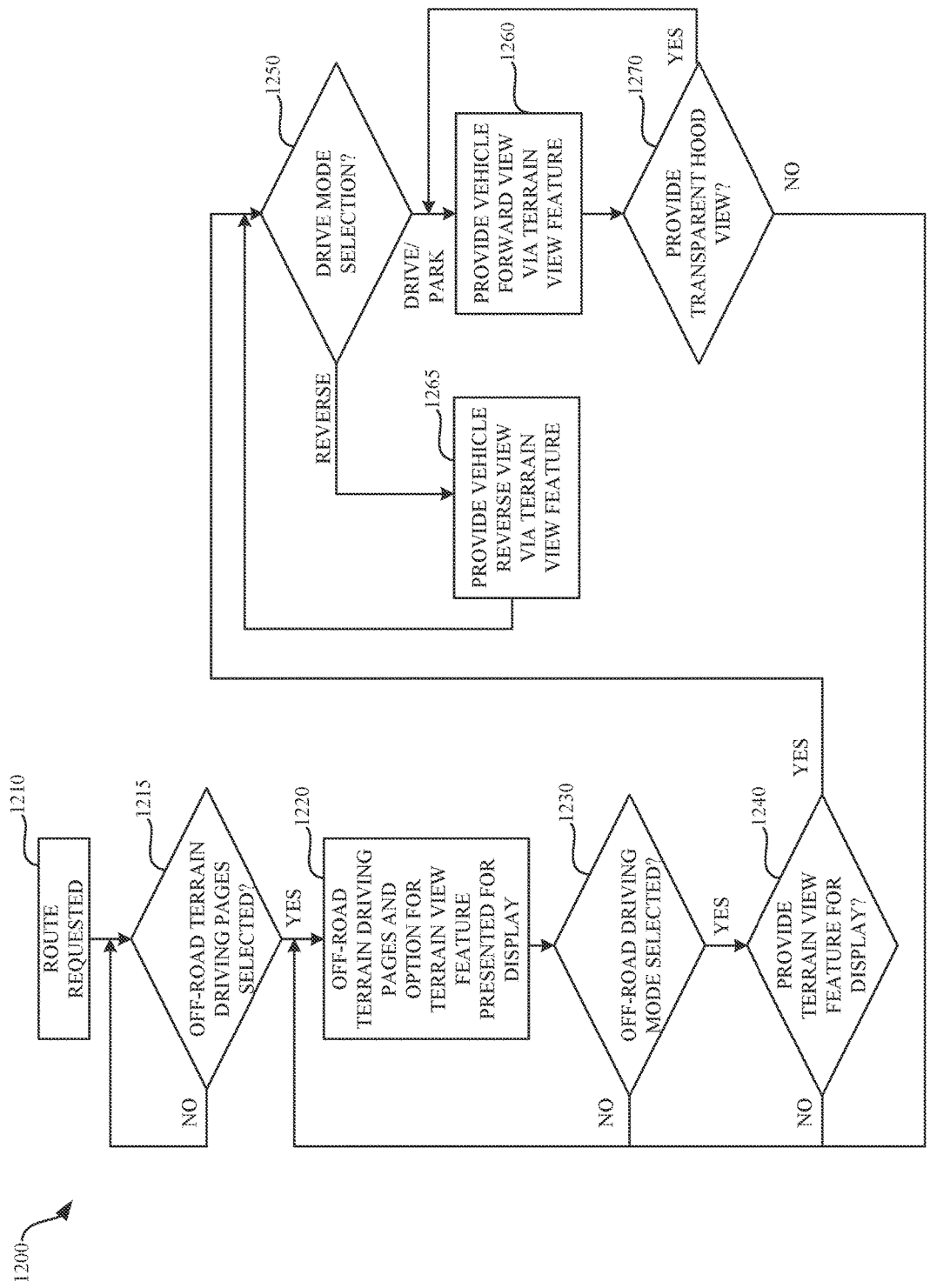
FIG. 12 illustrates a flow diagram of an example process flow for enabling a terrain view feature with passive functionality on a vehicle in accordance with one or more implementations of the subject technology.

FIG. 12 illustrates a flow diagram 1200 of an example process flow for enabling a terrain view feature with passive functionality on a vehicle in accordance with one or more implementations of the subject technology. At step 1210, a route is requested. For example, a navigational input may be received to initiate a route projection for a vehicle (e.g., the vehicle 120). At step 1215, the processor 302 may determine whether off-road terrain driving pages are selected. If the off-road driving pages are selected, then the process proceeds to step 1220. Otherwise, the process proceeds back to step 1215. In one or more implementations, a driving page may refer to a driving information display that is displayed on the infotainment display system 160 to provide driving-related information to a user of the vehicle 100, allowing the user to monitor various aspects of the vehicle's performance and status while on the road. In some aspects, the driving page may include a speedometer, a tachometer, a fuel gauge, an odometer, trip information, gear position indicator, warning messages, outside temperature, audio information, navigation instructions, or the like.

At step 1220, the processor 302 may provide for display, via the infotainment display system 160, the selected off-road terrain driving pages and an option for a terrain view feature. At step 1230, the processor 302 may determine whether off-road driving mode is selected by the driver. If the off-road driving mode is indeed selected, the process then proceeds to step 1240. Otherwise, the process proceeds back to step 1220.

At step 1240, the processor 302 may determine whether to provide the terrain view feature for display to the driver. If the terrain view feature is to be displayed, then the process proceeds to step 1250. Otherwise, the process proceeds back to step 1220. At step 1250, a determination is made as to the drive mode selection. If a reverse drive mode is selected, then the process proceeds to step 1265. Otherwise, the drive mode/park mode is selected and the process proceeds to step 1260. At step 1265, the vehicle is provided with the reverse view via the terrain view feature. At completion of the reverse view via the terrain view feature, the process proceeds back to step 1250.

At step 1260, the processor 302 may provide for display the forward view via the terrain view feature. At completion of the forward view via the terrain view feature, the process proceeds to step 1270. At step 1270, a determination is made whether to provide a transparent hood view via the terrain view feature. If the driver selects to display the transparent hood view, then the process proceeds back to step 1260 to provide the transparent hood view in the forward view. Otherwise, the process proceeds back to step 1220.

Figure 13:
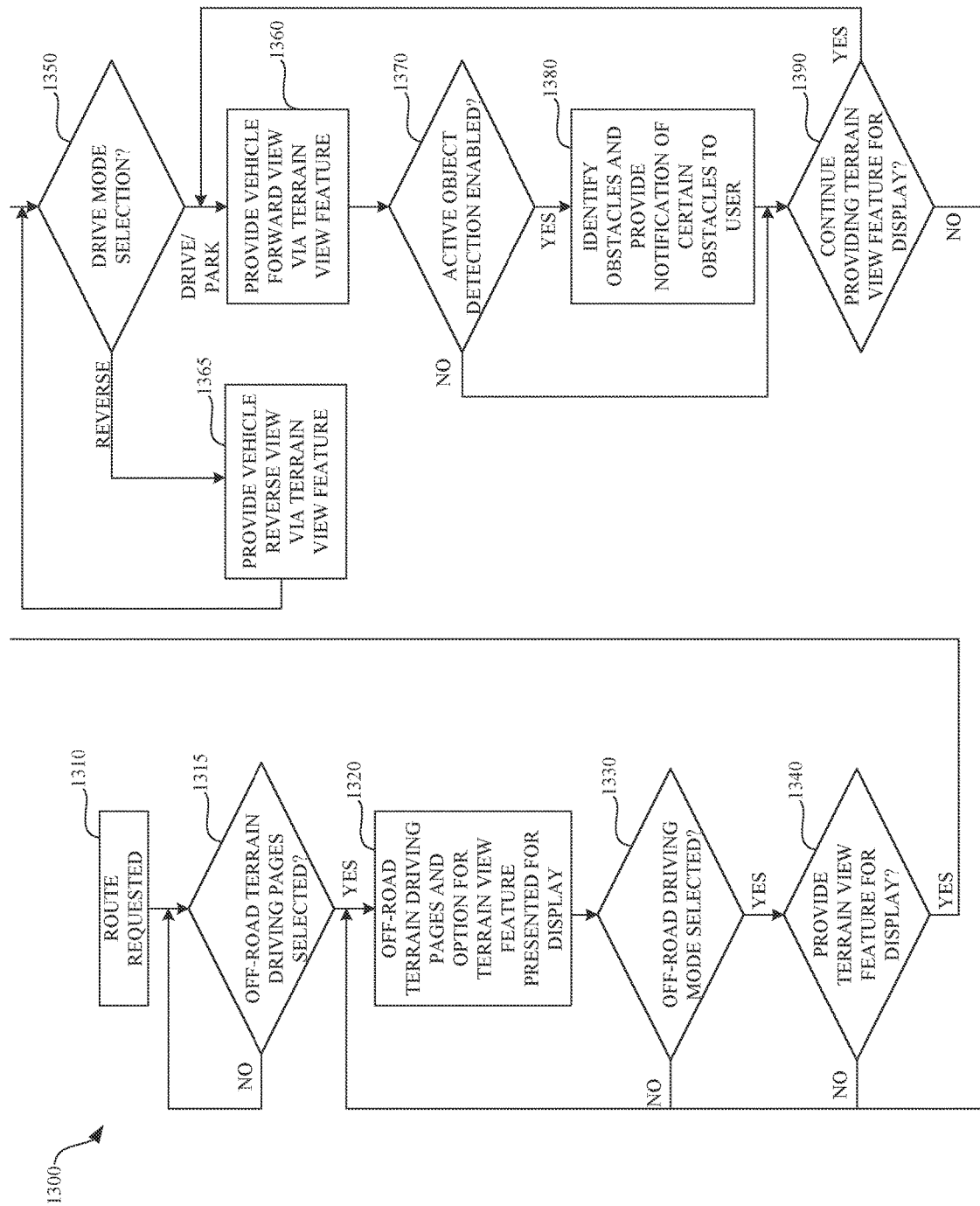
FIG. 13 illustrates a flow diagram of an example process flow for enabling a terrain view feature with active functionality on a vehicle in accordance with one or more implementations of the subject technology.

FIG. 13 illustrates a flow diagram 1300 of an example process flow for enabling a terrain view feature with active functionality on a vehicle in accordance with one or more implementations of the subject technology. At step 1310, a route is requested. For example, a navigational input may be received to initiate a route projection for a vehicle (e.g., the vehicle 100). At step 1315, the processor 302 may determine whether off-road terrain driving pages are selected. If the off-road driving pages are selected, then the process proceeds to step 1320. Otherwise, the process proceeds back to step 1315.

At step 1320, the processor 302 may provide for display, via the infotainment display system 160, the selected off-road terrain driving pages and an option for a terrain view feature. At step 1330, a determination is made as whether off-road driving mode is selected by the driver. If the off-road driving mode is indeed selected, the process then proceeds to step 1340. Otherwise, the process proceeds back to step 1320.

At step 1340, the processor 302 may determine whether to provide the terrain view feature for display to the driver. If the terrain view feature is to be displayed, then the process proceeds to step 1350. Otherwise, the process proceeds back to step 1320. At step 1350, the processor 302 may determine the drive mode selection. If a reverse drive mode is selected, then the process proceeds to step 1365. Otherwise, the drive mode/park mode is selected and the process proceeds to step 1360. At step 1365, the vehicle is provided with the reverse view via the terrain view feature. At completion of the reverse view via the terrain view feature, the process proceeds back to step 1350.

At step 1360, the processor 302 may provide for display the forward view via the terrain view feature. At completion of the forward view via the terrain view feature, the process proceeds to step 1370. At step 1370, the processor 302 may determine whether active object detection is enabled. If the active object detection is indeed enabled, then the process proceeds to step 1380. Otherwise, the process proceeds to step 1390.

At step 1380, the terrain view feature includes identifying obstacles encountered ahead of the vehicle path and providing notification of certain obstacles to the driver. For example, the terrain view feature may highlight and notify the driver when the detected obstacles are determined to be dangerous. In some aspects, the notification may be presented to the driver even when the terrain view feature is not actively provided for display via the user interface (e.g., infotainment system).

At step 1390, the processor 302 may determine whether to continue providing the terrain view feature for display. If the determination shows to continue providing the terrain view feature for display, then the process proceeds back to step 1360 to continue providing the forward view via the terrain view feature. Otherwise, the process proceeds back to step 1320.

Figure 14:
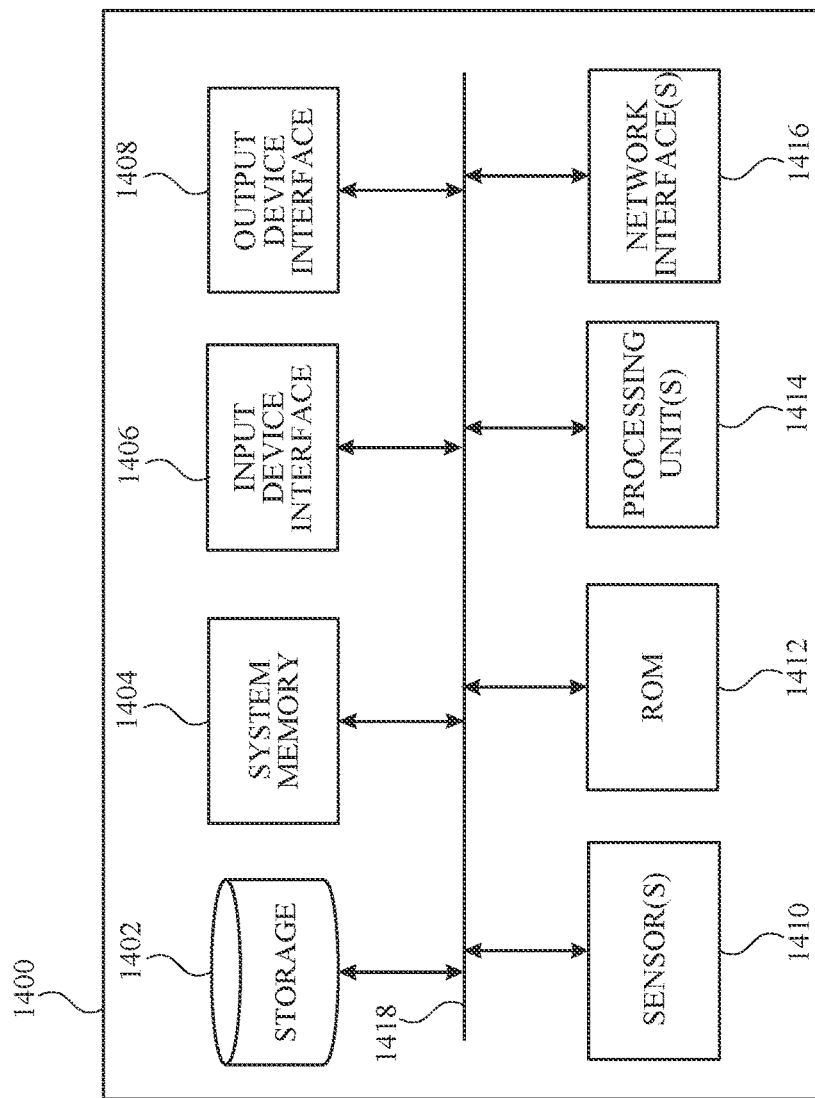
FIG. 14 illustrates an electronic system with which one or more implementations of the subject technology may be implemented.

FIG. 14 illustrates an example electronic system 1400 with which aspects of the present disclosure may be implemented. The electronic system 1400 can be, and/or can be a part of, any electronic device for providing the features and performing processes described in reference to FIGS. 1-12, including but not limited to a vehicle, computer, server, smartphone, and wearable device (e.g., authentication device). The electronic system 1400 may include various types of computer-readable media and interfaces for various other types of computer-readable media. The electronic system 1400 includes a persistent storage device 1402, system memory 1404 (and/or buffer), input device interface 1406, output device interface 1408, sensor(s) 1410, ROM 1412, processing unit(s) 1414, network interface 1416, bus 1418, and/or subsets and variations thereof.

The bus 1418 collectively represents all system, peripheral, and chipset buses that communicatively connect the numerous internal devices and/or components of the electronic system 1400, such as any of the components of the vehicle 100 discussed above with respect to FIG. 2. In one or more implementations, the bus 1418 communicatively connects the one or more processing unit(s) 1414 with the ROM 1412, the system memory 1404, and the persistent storage device 1402. From these various memory units, the one or more processing unit(s) 1414 retrieves instructions to execute and data to process in order to execute the processes of the subject disclosure. The one or more processing unit(s) 1414 can be a single processor or a multi-core processor in different implementations. In one or more implementations, one or more of the processing unit(s) 1414 may be included on an ECU 150, such as in the form of the processor 302.

The ROM 1412 stores static data and instructions that are needed by the one or more processing unit(s) 1414 and other modules of the electronic system 1400. The persistent storage device 1402, on the other hand, may be a read-and-write memory device. The persistent storage device 1402 may be a non-volatile memory unit that stores instructions and data even when the electronic system 1400 is off. In one or more implementations, a mass-storage device (such as a magnetic or optical disk and its corresponding disk drive) may be used as the persistent storage device 1402.

In one or more implementations, a removable storage device (such as a flash drive, and its corresponding disk drive) may be used as the persistent storage device 1402. Like the persistent storage device 1402, the system memory 1404 may be a read-and-write memory device. However, unlike the persistent storage device 1402, the system memory 1404 may be a volatile read-and-write memory, such as RAM. The system memory 1404 may store any of the instructions and data that one or more processing unit(s) 1414 may need at runtime. In one or more implementations, the processes of the subject disclosure are stored in the system memory 1404, the persistent storage device 1402, and/or the ROM 1412. From these various memory units, the one or more processing unit(s) 1414 retrieves instructions to execute and data to process in order to execute the processes of one or more implementations.

The persistent storage device 1402 and/or the system memory 1404 may include one or more machine learning models. Machine learning models, such as those described herein, are often used to form predictions, solve problems, recognize objects in image data, and the like. For example, machine learning models described herein may be used to predict whether an authorized user is approaching a vehicle and intends to open a charging port closure. Various implementations of the machine learning model are possible. For example, the machine learning model may be a deep learning network, a transformer-based model (or other attention-based models), a multi-layer perceptron or other feed-forward networks, neural networks, and the like. In various examples, machine learning models may be more adaptable as machine learning models may be improved over time by re-training the models as additional data becomes available.

The bus 1418 also connects to the input device interfaces 1406 and output device interfaces 1408. The input device interface 1406 enables a user to communicate information and select commands to the electronic system 1400. Input devices that may be used with the input device interface 1406 may include, for example, alphanumeric keyboards, touch screens, and pointing devices. The output device interface 1408 may enable the electronic system 1400 to communicate information to users. For example, the output device interface 1408 may provide the display of images generated by electronic system 1400. Output devices that may be used with the output device interface 1408 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information.

One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

The bus 1418 also connects to sensor(s) 1410. The sensor(s) 1410 may include a location sensor, which may be used in determining device position based on positioning technology. For example, the location sensor may provide for one or more of global navigation satellite system (GNSS) positioning, wireless access point positioning, cellular phone signal positioning, Bluetooth signal positioning, image recognition positioning, and/or an inertial navigation system (e.g., via motion sensors such as an accelerometer and/or gyroscope). In one or more implementations, the sensor(s) 1410 may be utilized to detect movement, travel, and orientation of the electronic system 1400. For example, the sensor(s) may include an accelerometer, a rate gyroscope, and/or other motion-based sensor(s). The sensor(s) 1410 may include one or more biometric sensors and/or image sensors for authenticating a user.

The bus 1418 also couples the electronic system 1400 to one or more networks and/or to one or more network nodes through the one or more network interface(s) 1416. In this manner, the electronic system 1400 can be a part of a network of computers (such as a local area network or a wide area network). Any or all components of the electronic system 1400 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the present disclosure. The word exemplary is used to mean serving as an example or illustration. To the extent that the term includes, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different orders. Some of the steps, operations, or processes may be performed simultaneously. The accompanying method claims, if any, present elements of the various steps, operations, or processes in a sample order, and are not meant to be limited to the specific order or hierarchy presented. These may be performed in serial, linearly, in parallel, or in different order. It should be understood that the described instructions, operations, and systems can generally be integrated together in a single software/hardware product or packaged into multiple software/hardware products.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims.

Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

Those of skill in the art would appreciate that the various illustrative blocks, modules, elements, components, methods, and algorithms described herein may be implemented as hardware, electronic hardware, computer software, or combinations thereof. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

The title, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A method, comprising:
receiving a route request to provide a route projection for a vehicle;
receiving, by a processor, first data from a first camera of the vehicle and second data from a second camera of the vehicle, the first data comprising an image representation of a scene in a first field of view and the second data comprises an image representation of the scene in a second field of view;
creating, by the processor, a stitched image representing the scene in a combined field of view by stitching the first data having the first field of view with the second data having the second field of view, the stitched image being provided with overlay information mapped to pixel coordinates of the stitched image;
determining, by the processor, a metric indicating a likelihood that an operator of the vehicle is uncertain of a current placement of the vehicle relative to an obstacle in a path of the vehicle based on one or more vehicle state parameters;
providing, for display via an infotainment display of the vehicle, a user prompt indicating an option to activate a terrain view of the vehicle based at least in part on the metric; and
providing, for display, the terrain view comprising the stitched image and an underbody view of the vehicle in response to a received input via the infotainment display indicating activation of the terrain view, the terrain view being displayed in one of a plurality of selectable views based on a driving mode of the vehicle, the overlay information in the terrain view indicating a representation of tire placement overlaid on the underbody view of the vehicle with wheel trajectories along the route projection.

2. The method of claim 1, further comprising:
determining the driving mode of the vehicle;
selecting the one of the plurality of selectable views based on the driving mode of the vehicle; and
providing, for display, the stitched image in the selected one of the plurality of selectable views.

3. The method of claim 1, wherein the overlay information comprises trajectory guidelines superimposed on at least a portion of the stitched image, the trajectory guidelines indicating at least a portion of the route projection of the vehicle.

4. The method of claim 1, further comprising determining whether one or more obstacles are detected in the stitched image, wherein the overlay information indicates how to navigate around the one or more obstacles when the one or more obstacles are detected in the stitched image.

5. The method of claim 4, wherein the overlay information comprises object detection information superimposed on at least a portion of the stitched image, the object detection information indicating detection of one or more objects based on a proximity between the route projection of the vehicle and the one or more objects detected in the stitched image.

6. The method of claim 5, further comprising providing, for display, a notification associated with the detection of the one or more objects.

7. The method of claim 1, wherein at least one of the plurality of selectable views comprises the stitched image having an image representation of a transparent hood view superimposed with an image representation of at least a portion of the scene underneath of the vehicle.

8. The method of claim 1, wherein the driving mode is one of a drive mode, a park mode, or a reverse mode.

9. A vehicle, comprising:
a first camera;
a second camera; and
a processor configured to:
receive a route request to provide a route projection for the vehicle;
receive first data from the first camera, the first data comprising an image representation of a scene in a first field of view;
receive second data from the second camera, the second data comprising an image representation of the scene in a second field of view;
combine the first data having the first field of view with the second data having the second field of view to create a stitched image representing the scene in a combined field of view;

provide overlay information mapped to pixel coordinates of the stitched image;

determine, by the processor, a metric indicating a likelihood that an operator of the vehicle is uncertain of a current placement of the vehicle relative to an obstacle in a path of the vehicle based on one or more vehicle state parameters;

provide, for display via an infotainment display of the vehicle, a user prompt indicating an option to activate a terrain view of the vehicle based at least in part on the metric; and provide, for display, the terrain view comprising the stitched image, the overlay information and an underbody view of the vehicle in response to a received input via the infotainment display indicating activation of the terrain view, the terrain view being displayed in one of a plurality of selectable views based on a driving mode of the vehicle, the overlay information in the terrain view indicating a representation of at least a portion tire placement overlaid on the underbody view of the vehicle with wheel trajectories along the route projection.

10. The vehicle of claim 9, wherein the overlay information comprises trajectory guidelines superimposed on at least a portion of the stitched image, the trajectory guidelines indicating at least a portion of the route projection of the vehicle.

11. The vehicle of claim 9, wherein the processor is further configured to determine whether one or more obstacles are detected in the stitched image, wherein the overlay information indicates how to navigate around the one or more obstacles when the one or more obstacles are detected in the stitched image.

12. The vehicle of claim 11, wherein the overlay information comprises object detection information superimposed on at least a portion of the stitched image, the object detection information indicating detection of one or more objects based on a proximity between the route projection of the vehicle and the one or more objects detected in the stitched image.

13. The vehicle of claim 12, wherein the processor is further configured to provide, for display, a notification associated with the detection of the one or more objects.

14. The vehicle of claim 9, wherein at least one of the plurality of selectable views comprises the stitched image having an image representation of a transparent hood view superimposed with an image representation of at least a portion of the scene underneath of the vehicle.

15. A system comprising:
memory; and
at least one processor coupled to the memory and configured to:
determine, by the processor, a metric indicating a likelihood that an operator of a vehicle is uncertain of a current placement of the vehicle relative to an obstacle in a path of the vehicle based on one or more vehicle state parameters;

provide, for display via an infotainment display of the vehicle, a user prompt indicating an option to activate a terrain view of the vehicle based at least in part on the metric;

receive, via the infotainment display, user input indicating a terrain view selection to activate the terrain view;

combine first data having a first field of view from a first camera of a vehicle with second data having a second field of view from a second camera of the vehicle to create a stitched image representing a combination of the first field of view and the second field of view;

provide overlay information mapped to pixel coordinates of the stitched image; and provide, for display, in response to the terrain view selection, the terrain view comprising the stitched image, the overlay information and an underbody view of the vehicle in response to a received input via the infotainment display indicating activation of the terrain view, the terrain view being displayed in one of a plurality of selectable views based on a driving mode of the vehicle, the overlay information in the terrain view indicating a representation of tire placement overlaid on the underbody view of the vehicle with wheel trajectories along the path of the vehicle.

16. The system of claim 15, wherein the at least one processor is further configured to receive a route request for a route projection of the vehicle.

17. The system of claim 15, wherein the overlay information comprises trajectory guidelines superimposed on at least a portion of the stitched image, the trajectory guidelines indicating at least a portion of a route projection of the vehicle.

18. The system of claim 15, wherein the at least one processor is further configured to determine whether one or more obstacles are detected in the stitched image, wherein the overlay information indicates how to navigate around the one or more obstacles when the one or more obstacles are detected in the stitched image.

19. The system of claim 18, wherein the overlay information comprises object detection information superimposed on at least a portion of the stitched image, the object detection information indicating detection of one or more objects based on a proximity between a route projection of the vehicle and the one or more objects detected in the stitched image.

20. The system of claim 19, wherein the at least one processor is further configured to provide, for display, a notification associated with the detection of the one or more objects.

* * * * *